(12) United States Patent
Liu et al.

(10) Patent No.: US 7,493,661 B2
(45) Date of Patent: Feb. 17, 2009

(54) SECURE TRANSMISSION SYSTEM

(75) Inventors: Gary G. Liu, Plano, TX (US); David P. Cook, Dallas, TX (US)

(73) Assignee: Zix Corporation, Dallas, TX (US)

( * ) Notice: Subject to any disclaimer, the term of this patent is extended or adjusted under 35 U.S.C. 154(b) by 761 days.

(21) Appl. No.: 10/884,712

(22) Filed: Jul. 1, 2004

(65) Prior Publication Data
US 2004/0249817 A1 Dec. 9, 2004

Related U.S. Application Data

(63) Continuation of application No. 09/340,853, filed on Jun. 28, 1999, now Pat. No. 6,760,752.

(51) Int. Cl.
G06F 7/04 (2006.01)

(52) U.S. Cl. .................. 726/28; 380/259; 380/262; 380/286; 380/285; 380/45; 380/282; 713/171; 713/181; 713/183; 711/216

(58) Field of Classification Search ............ 726/28–30, 726/4, 277, 283; 380/28–30, 277, 282, 283, 380/286, 259, 262, 285, 45; 713/182, 168, 713/155, 165, 171, 156, 181, 183
See application file for complete search history.

(56) References Cited

U.S. PATENT DOCUMENTS

| 4,588,985 | A | * | 5/1986 | Carter et al. ................ 341/95 |
| 5,748,735 | A | * | 5/1998 | Ganesan .................... 713/165 |
| 5,761,309 | A | | 6/1998 | Ohashi et al. |
| 6,073,124 | A | | 6/2000 | Krishnan et al. |
| 6,073,242 | A | * | 6/2000 | Hardy et al. ................... 726/1 |
| 6,081,899 | A | | 6/2000 | Byrd |
| 6,105,012 | A | * | 8/2000 | Chang et al. ................. 705/64 |
| 6,125,445 | A | * | 9/2000 | Arditti et al. ............... 713/169 |
| 6,144,949 | A | | 11/2000 | Harris |
| 6,154,543 | A | * | 11/2000 | Baltzley ..................... 380/255 |
| 6,185,308 | B1 | * | 2/2001 | Ando et al. ................. 380/286 |
| 6,189,096 | B1 | | 2/2001 | Haverty |
| 6,189,098 | B1 | | 2/2001 | Kaliski, Jr. |
| 6,189,100 | B1 | | 2/2001 | Barr et al. |
| 6,195,698 | B1 | * | 2/2001 | Lillibridge et al. .......... 709/225 |
| 6,199,052 | B1 | | 3/2001 | Mitty et al. |
| 6,211,972 | B1 | | 4/2001 | Okutomi et al. |
| 6,226,383 | B1 | | 5/2001 | Jablon |
| 6,230,269 | B1 | * | 5/2001 | Spies et al. ................. 713/182 |
| 6,285,991 | B1 | | 9/2001 | Powar |
| 6,292,895 | B1 | * | 9/2001 | Baltzley ..................... 713/168 |
| 6,327,656 | B2 | | 12/2001 | Zabetian |
| 6,351,812 | B1 | | 2/2002 | Datar et al. |
| 6,351,813 | B1 | * | 2/2002 | Mooney et al. ............. 713/185 |

(Continued)

Primary Examiner—Kristine Kincaid
Assistant Examiner—Canh Le
(74) Attorney, Agent, or Firm—Fish & Richardson P.C.

(57) ABSTRACT

A method and apparatus for transferring a message securely from a sender to a recipient over a network and includes at each transfer: creating a message; retrieving the public key of the recipient from an external key server just prior to sending the message; signing the message using the private key of the sender; encrypting the signed message using a public key encryption algorithm and the public key of the recipient producing an encrypted signed message; generating an E-mail message addressed to the recipient; attaching the encrypted signed message as an attachment to the E-mail message; and, transmitting the E-mail message to the recipient.

8 Claims, 21 Drawing Sheets

U.S. PATENT DOCUMENTS

| | | |
|---|---|---|
| 6,381,696 B1 | 4/2002 | Doyle |
| 6,424,718 B1 | 7/2002 | Holloway |
| 6,442,688 B1 * | 8/2002 | Moses et al. ................ 713/158 |
| 6,529,603 B1 * | 3/2003 | Palmer ....................... 380/286 |
| 6,662,299 B1 * | 12/2003 | Price, III .................... 713/171 |

* cited by examiner

SECURE TRANSMISSION SYSTEM

CROSS-REFERENCE TO RELATED APPLICATIONS

This application is a continuation and claims the benefit of priority under 35 U.S.C. 120 of application Ser. No. 09/340,853, filed Jun. 28, 1999, now U.S. Pat. No. 6,760,752.

FIELD OF THE INVENTION

The invention relates generally to computing systems and more particularly to a method and system for providing secure data transmissions between Internet users.

BACKGROUND OF THE INVENTION

The Internet is a global network of computers that uses a common communication protocol, the Transfer Control Protocol/Internet Protocol (TCP/IP), to transmit data from one location to another. Many application specific tasks, such as E-mail transmission and file transfer, are not directly supported by TCP/IP. Instead, support for these services is implemented by application specific protocols that in turn rely on TCP/IP for basic data transport services. One problem that is relatively unknown to individuals that make use of the Internet is the ease by which information can be obtained during transmission by unauthorized eavesdroppers. For example, most E-mail transmissions over the Internet are sent in cleartext. Cleartext is unencrypted data that can be intercepted anywhere along the path between a sender and the recipient.

Accordingly, sensitive business or personal information should not be transmitted in cleartext over the Internet. To do so is to risk its publication. To avoid this risk, sensitive data is often sent by courier services at great cost.

Encryption mechanisms can be used to ensure the integrity of information sent over the Internet. Two common encryption techniques, symmetric key encryption and public key encryption, are described below. In a symmetric key encryption, a unique key is identified and used by the sender to encrypt and by the receiver to decrypt a message. In public key encryption, separate keys are used to encrypt and to decrypt a message.

While secure communications are desirable, the mechanisms required to ensure security can be difficult to implement in a network environment. Private networks that include connections to public networks are often shielded using a firewall. A firewall provides a gateway between a public and a private network, or between public and private portions of a single network. A firewall can screen incoming and outgoing traffic to ensure integrity of the traffic between the two distinct domains. While the screening is desirable to avoid unauthorized access to or transfers of data, the additional security measures can have undesirable effects in limiting the kind or form of traffic that is able easily to be transmitted through the gateway.

SUMMARY OF THE INVENTION

In one aspect, the invention provides a method for transferring a message securely from a sender to a recipient over a network and includes at each transfer: creating a message; retrieving the public key of the recipient from an external key server just prior to sending the message; signing the message using the private key of the sender; encrypting the signed message using a public key encryption algorithm and the public key of the recipient producing an encrypted signed message; generating an E-mail message addressed to the recipient; attaching the encrypted signed message as an attachment to the E-mail message; and, transmitting the E-mail message to the recipient.

Aspects of the invention can include one or more of the following features. The step of retrieving the public key of the recipient can include verifying a status of a public key for the sender and where the external key server is operable to not return the recipient's public key unless the status of the sender's public key is active.

Verifying the status of a public key of the sender can include sending a hash of a sender's public key to a external key server where the external key server is operable to maintain a status for each public key stored therein and enabled to return the status for a particular public key when the hash is received.

The external key server can be a single central key server. The external key server can be one of a group of external key servers each including a repository of public keys.

Substantially contemporaneous with sending the message, the method can include prompting the sender for a signature phrase, decrypting the private key of the sender using the signature phrase, applying a hash function to a sender's public key to produce a hash and verifying a status of the sender's public key including submitting the hash to the external key server to enable a look-up of a status of a public key of the sender.

The method can include designating a signature phrase by each user, either sender or recipient, encrypting a private key of the user using the signature phrase and storing the encrypted private key locally at a user's computer.

The step of retrieving the public key of the recipient can include generating a request for a current public key of the recipient where the request can include an identifier for the recipient.

The identifier can be an E-mail address for the recipient or a hash of an E-mail address for the recipient.

The step of encrypting can include generating a random number, encrypting the message using the random number as a session key in a symmetric key encryption algorithm and encrypting the session key using a public key encryption algorithm and the public key of the recipient.

The step of signing a message can include decrypting a private key of the sender and applying a digital signature algorithm to the message using the sender's private key.

The step of decrypting the private key can includes prompting the user for a signature phrase, applying a hash function to the signature phrase and decrypting the private key using a symmetric key encryption algorithm where the hash is used as the symmetric key.

The step of attaching the signed document can include designating a recipient's E-mail address and the sender's E-mail address, designating one or more of a public title and public message body for the E-mail message and attaching the encrypted signed message as an attachment to the E-mail message addressed to the recipient.

The step of transmitting can include transmitting the E-mail message to a forwarding proxy using a non-SMTP protocol where the forwarding proxy is operable to extract the E-mail message and forward the E-mail message to the recipient. The non-SMTP protocol can be the HTTP protocol.

The method can include creating an HTTP post including the E-mail message and transmitting the HTTP post. The forwarding proxy can forward the E-mail message by SMTP.

The method can include attaching a random number to the E-mail message prior to transferring where the forwarding proxy is operable to verify the random number is valid based on a predefined criterion, and if not, will not forward the E-mail message. The predefined criterion can be the passage of a predefined amount of time.

The method can include attaching a return receipt request to the E-mail message and acknowledging the return of a receipt including displaying the receipt to the sender. The opening of the E-mail message by the recipient can be conditioned upon the return of the return receipt.

The step of generating an E-mail message can include creating a MIME E-mail message addressed to the recipient. The step of attaching the signed document can include attaching the signed document to the MIME mail message as a MIME attachment. The step of transmitting can include sending the MIME mail message to the recipient.

The central key server can be one of a plurality of distributed key servers, each of which include public keys and status information to enable key retrieval from multiple locations, which facilitates secure transfers of messages between users.

In another aspect, the invention provides a method for transferring E-mail messages securely from a sender to a recipient over a network including, substantially contemporaneous with the transmission of a secure E-mail transmission from the sender to the recipient, retrieving the public key of the recipient from an external key server to ensure an active public key for the recipient is used in encrypting the message.

Aspects of the invention can include one or more of the following features. The step of retrieving can include verifying the status of a sender's public key at the external key server to ensure the sender's public key is available to allow for the authentication by the recipient of the E-mail message sent by the sender.

The step of retrieving can include retrieving a time stamp from the external key server.

The time stamp can be signed by a public key of the external key server.

In another aspect, the invention provides a method for verifying the authenticity of a message received by a recipient process. The message is generated by a sender process and transferred using secure means over a network. The method includes decrypting a signed encrypted message exposing a message signed by the sender, verifying the sender's signature, requesting a status for the sender's public key from an external key server and displaying the status of the sender's public key and the decrypted message.

Aspects of the invention can include one or more of the following features. The step of requesting a status for the sender's public key from an external key server can includes receiving signed status information from the external key server. The method can further include verifying the external key server's signature used to sign the status information.

The step of requesting a status for the sender's public key from an external key server can include receiving unsigned status information from the external key server.

The step of requesting a status for the sender's public key from an external key server can include receiving a time stamp certificate from the external key server.

The step of decrypting can include exposing a time stamp certificate signed by an external key server and associated with the signed encrypted message and verifying the external key server's signature used to sign the time stamp certificate.

The step of displaying can include displaying the time stamp certificate.

The public key encryption algorithm can be selected so that encrypting processes are substantially faster than decrypting processes. The public key encryption algorithm can be a Rabin algorithm.

The step of displaying can include displaying two indicators and enabling an appropriate one of the two based on the status of the sender's public key, either valid or invalid. The step of displaying can include displaying three or more indicators and enabling an appropriate one of the three based on the status of the sender's public key, either valid, invalid or valid when signed but now invalid.

The step of decrypting a signed message can include recovering the recipient's private key, applying a public key encryption algorithm to the encrypted session key included with the encrypted signed message to recover a session key and applying a symmetric key encryption algorithm to the encrypted signed message using the session key to recover the message.

Messages can be signed using a signature algorithm that is selected so that verifying a signature is substantially faster than signing a message. The signature algorithm can be a Rabin algorithm.

The step of recovering the private key can include prompting the user for a signature phrase, applying a hash function to the signature phrase and decrypting the private key using a symmetric key encryption algorithm where the hash is used as a session key. The step of applying a hash function can include applying the hash function to the signature phrase a large number of times, applying the hash function to the signature phrase approximately 5000 times, or applying multiple hash functions to the signature phrase.

The step of verifying a signature can include applying a hash function to a signed message resulting in a first hash and comparing the first hash with an associated second hash received from a signing party. The signing party can be the sender, the signed message can be the signed encrypted message and the second hash can be recovered when decrypting the signed encrypted message. The signing party can be the external key server, the signed message can be the time stamp certificate and the second hash can be recovered when decrypting the signed encrypted message. The signing party can be the external key server, the signed message can be the status information and the second hash can be generated by the external key server and provided along with the status information. The signing party can be the external key server, the signed message can be the recipient's public key and the second hash can be recovered when decrypting the signed encrypted message.

Verifying the status of a public key of the sender can include sending a request to the external key server including an identifier designating the public key of the sender where the central key server is operable to maintain a status for each public key stored therein and enabled to return the status for a particular public key of the sender when the identifier is received.

In another aspect, the invention provides a method for transferring a message securely from a sender process to a recipient process over a network and includes creating a message and receiving the E-mail message. The step of creating includes retrieving a public key of the recipient and verifiable transmission time stamp where the transmission time stamp generated and signed by an external key server independent of the sender process, signing the encrypted message, encrypting the signed message using a public key encryption algorithm and the public key of the recipient and attaching the encrypted message to an E-mail message. The step of receiving the E-mail message includes decrypting the signed encrypted message, verifying the sender's signature mathematically, requesting a status for the sender's public key from an external key server including receiving signed status information, verifying the external server's signature that signed the status information and displaying the status of the sender's public key, the time stamp certificate and the decrypted message.

In another aspect, the invention provides a method for securely transferring a message from a sender to a recipient over a network and includes creating a message, retrieving the public key of the recipient from an external key server, encrypting the message using a public key encryption algorithm and the public key of the recipient producing an encrypted message and transmitting the E-mail message to a forwarding proxy using a non-SMTP protocol where the forwarding proxy is operable to extract the E-mail message and forward the E-mail message to the recipient.

Aspects of the invention can include one or more of the following features. The non-SMTP protocol can be the HTTP protocol. The method can include creating an HTTP post including the E-mail message and transmitting the HTTP post. The forwarding proxy can forward the E-mail message by SMTP.

In another aspect, the invention provides, in a public key encryption system that includes a central key repository and a plurality of users, where a user's public key is stored at the central key repository and the user's associated private key is stored locally on a user's computer, a method for recovering lost keys including designating an recovery question and an answer to the recovery question, encrypting the user's private key using a first hash of the answer as a session key in a symmetric key encryption process, taking a different hash of the answer producing a second hash and storing the second hash and the recovery question at the central key repository. When prompted by the user to recover a lost private key, the method includes prompting the user to provide the answer, taking the different hash of the answer provided producing a third hash and transmitting the third hash to the central key repository without transmitting the answer itself and comparing the second and third hashes. If they match, the encrypted private key is returned to the user and the private key is decrypted using the first hash and stored.

In another aspect, the invention provides an apparatus for creating and viewing secure messages transferred over a network between one or more senders and recipients. The apparatus includes a composer viewer operable to compose a message, retrieve a public key and public key status for a recipient of the message, verify an active status of a sender's public key, encrypt the message and view secure messages received from other senders, and a communication process for transferring composed messages out from the sender and for receiving composed messages from other senders.

Aspects of the invention can include one or more of the following features. The composer viewer can be operable to retrieve the public key and public key status just prior to the transfer of the message to the recipient.

The composer viewer can be operable to retrieve a time stamp certificate that certifies the sender's identity, the recipient's identity, the integrity of the message, and the time that the message was sent.

In another aspect, the invention provides, in a public key encryption system that includes a central key repository and a plurality of users, where a user's public key is stored at the central key repository and the user's associated private key is stored locally on a user's computer, and where messages are signed by a private key of the central key repository and can be verified by retrieving an associated public key for and from the central key repository, a method for certifying a document sent from the central key server is valid. The method includes creating a key server certificate including applying a signature operation to the public key of the central key repository using a verifiable private key of the central key repository, attaching the key server certificate to a document that is to be transferred to a user and needs to be certified, producing a certified document, and signing the certified document including applying a signature operation on the certified document using the public key of the central key repository.

In another aspect, the invention provides, in a public key encryption system that includes a central key repository, a plurality of users and a trusted third party server, where a user's public key is stored at the central key repository and the user's associated private key is stored locally on a user's computer, and where an encrypted version of a user's private key is stored by the trusted third party server for the benefit of beneficiary of the escrow process, a method for verifying the private key escrowed at the trusted third party server is same as the private key stored locally by a user without exposing the private key to the central key repository. The method includes, at the trusted third party server and prior to storing the user's private key, taking a hash of the private key producing a first hash, encrypting the private key using the public key of the escrow beneficiary, and storing the private key and returning the first hash to the user. At the user and prior to storing the user's private key locally, the method includes taking a hash of the private key producing a second hash, comparing the first and second hashes and, if the hashes match, storing the public key associated with the private key locally on the user's computer.

In another aspect, the invention provides an apparatus for transferring a message securely from a sender to a recipient over a network including a composer operable to create a message and retrieve a public key of the recipient from an external key server just prior to sending the message, a signature engine operable to sign the message using the private key of the sender, an encryption engine operable to encrypt the signed message using a public key encryption algorithm and the public key of the recipient producing an encrypted signed message, and a wrapping application operable to generate an E-mail message addressed to the recipient, attach the encrypted signed message as an attachment to the E-mail message and transmit the E-mail message to the recipient.

In another aspect, the invention provides an apparatus for verifying the authenticity of a message received by a recipient process where the message is generated by a sender process and transferred using secure means over a network. The apparatus includes a decryption engine for decrypting a signed encrypted message exposing a message signed by the sender, a verification engine operable to verify the sender's signature, request a status for the sender's public key from an external key server, receive status information from the external key server and verify the external key server's signature used to sign the status information and a display engine operable to display the status of the sender's public key and the decrypted message.

In another aspect, the invention provides an apparatus for securely transferring a message from a sender to a recipient over a network including a composer operable to create a message and retrieve the public key of the recipient from an external key server, an encryption engine for encrypting the message using a public key encryption algorithm and the public key of the recipient producing an encrypted message and a transmission system separable from the composer and operable to transmit the E-mail message to a forwarding proxy using a non-SMTP protocol where the forwarding proxy is operable to extract the E-mail message and forward the E-mail message to the recipient.

In another aspect, the invention provides a method for posting a public key for a user at a central key server where the public key is retrievable by a sender and used by a public key encryption process executed at the sender's computer to securely transfer a message from a sender to a recipient over a network. The method of posting includes generating a set of public and private keys, associating a unique E-mail address for the user with the set of public and private keys, storing the encrypted private key locally on the user's computer; and posting the public key including storing the public key at the central key server in a key list.

Aspects of the invention can include one or more of the following features. The key list can be indexed by the E-mail address or a hash of the E-mail address. The method can include designating a signature phrase where the signature phrase is used by the user's computer to encrypt the private key.

In another aspect, the invention provides a method for producing a set of public and private keys for a user where the public key is retrievable by a sender and used by a public key encryption process executed at the sender's computer to securely transfer a message from a sender to a recipient over a network. The method includes generating a large random number having a first size including generating a first random number at the user's computer and second random number at the central key server and mixing the first and second random numbers, using the large random number as a seed to generate two large prime numbers that form the user's private key, multiplying the two large prime numbers to produce a public key having a second size that is comparable to the first size and posting the public key at the central key server.

In another aspect the invention provides a method for producing a large random number used as a seed in generating a secure set of public and private keys for a user, where the public key includes a first size. The method includes generating a first random number at the user's computer, generating a second random number at a central key server and mixing the first and second random numbers to produce the large random number where that large random number has a second size that is comparable to the first size.

In another aspect, the invention provides a method for posting a public key for a user at a central key server where the public key is retrievable by a sender and used by a public key encryption process executed at the sender's computer to securely transfer a message from a sender to a recipient over a network. The method of posting includes generating a set of public and private keys, associating an E-mail address for the user with the set of public and private keys, escrowing the private key including retrieving a public key package for the central key server where the public key package includes a public key of a trusted third party, encrypting the private key with the public key of the trusted third party and sending the encrypted private key and public key to the central key server to be forwarded to the trusted third party for escrowing.

If the escrowing at the trusted third party is successful, a hash of the private key is received back from the trusted third party. The private key is hashed and compared with the hash received. and, if they match, the private key is stored locally at the user's computer. The method include receiving an E-mail confirmation request from the central key server at the E-mail address indicating that the escrowing process was successful and sending a confirmation to the central key server which, upon receipt, will cause the central key server to post the public key.

In another aspect, the invention provides a method of escrowing a set of public and private keys including generating a set of public and private keys, associating an E-mail address for the user with the set of public and private keys, escrowing the private key with a trusted third party including encrypting the private key and sending the encrypted private key to the trusted third party, receiving a successful escrow message from the trusted third party and verifying a private key escrowed by the trusted third party is the same is as the private key.

Aspects of the invention can include one or more of the following features. The method can include receiving a hash of the private key back from the trusted third party, hashing the private key and comparing the two hashes and if they match storing the private key locally at the user's computer.

The method can include receiving a confirmation request from the central key server at the E-mail address indicating that the escrowing process was successful and sending a confirmation to the central key server which, upon receipt, will cause the central key server to post the public key.

In another aspect, the invention provides a method for authenticating a message sent from a sender to a recipient over a network including generating a time stamp request including the message, sending to a time stamping authority the time stamp request, constructing a time stamp certificate comprising the message to be sent and the current time, returning the time stamp certificate to the sender and attaching the time stamp certificate to the message and sending the message to the recipient.

Aspects of the invention can include one or more of the following features. The time stamp request can include a hash of the message to be sent and the sender's and the recipient's E-mail addresses, the hash of the sender's and recipient's E-mail address, a hash of the message to be sent and the sender's and the recipient's E-mail addresses, the hash of the sender's and recipient's E-mail address, a hash of sender's public key and a status of the public key, or a hash of recipient's public key and a status of the public key.

The method can include signing the time stamp certificate with a private key of the time stamping authority.

In another aspect, the invention provides a method for authenticating a sender, a recipient and a message when transferring the message from the sender to the recipient over a network including generating, remotely from the sender, a time stamp certificate that includes the message, a time stamp, the recipient's and sender's public keys and recipient's and sender's public key status, attaching the time stamp certificate to the message and sending the message and the time stamp certificate to the recipient.

Aspects of the invention can include one or more of the following features. The time stamp certificate can include a hash of the message, the hash of the recipient's public key, the hash of the sender's public key the sender's and the recipient's E-mail addresses, a hash of the sender's and the recipient's E-mail addresses Implementations of the invention can include one or more of the following advantages.

Documents can be encrypted by the intended recipient's public key and signed with a signature that includes a remotely generated and signed time stamp provided from a central server. The remotely generated time stamp can be evaluated to verify the time of signing. The remotely generated time stamp can be in the form of a certificate that can be used to authenticate the sender's and recipient's public keys. Care is taken in the construction of the time stamp so that it cannot be tampered with or attached to other documents. The present invention provides an easy means for revoking a signature that assures both the sender and the recipient of the authenticity of each signature produced. A screening mechanism is provided that can alert a recipient to both invalid signatures as well as out of date signatures. A sender can be required to validate his/her own signature when sending a transmission (E-mail), thereby further ensuring the authenticity of each message transmitted. A public key retrieval is completed at each message transmission ensuring that the correct public key is retrieved for the recipient each time a message is sent. An algorithm that is optimized to minimize the amount of time required to encrypt messages is provided. The present invention provides verification of signature status similar to a certificate, but with the additional feature of public key validation at verification time.

A system is provided for secure E-mail services. Secure E-mail messages can be composed or generated using the secure messaging system, the result of which can be attached as a MIME message to a conventional E-mail message for transfer to a recipient. A viewer or reader is provided for opening the secure MIME attachment at a recipient device and for decrypting the underlying contents.

The secure MIME attachment can be sent directly by the composer, such in an SMTP message format, or attached and sent using a conventional E-mail program. While one implementation of the invention requires the client sender to have access to an SMTP server, an alternative implementation sends the secure message with an HTTP post. A forwarding proxy or relay is used to recover the secure message from the HTTP post and to forward the message as an attachment to a conventional E-mail message or as an SMTP message.

These and other advantages of the present invention will become apparent from the following description and from the claims.

DETAILED DESCRIPTION OF THE PREFERRED EMBODIMENT

Figure 1:
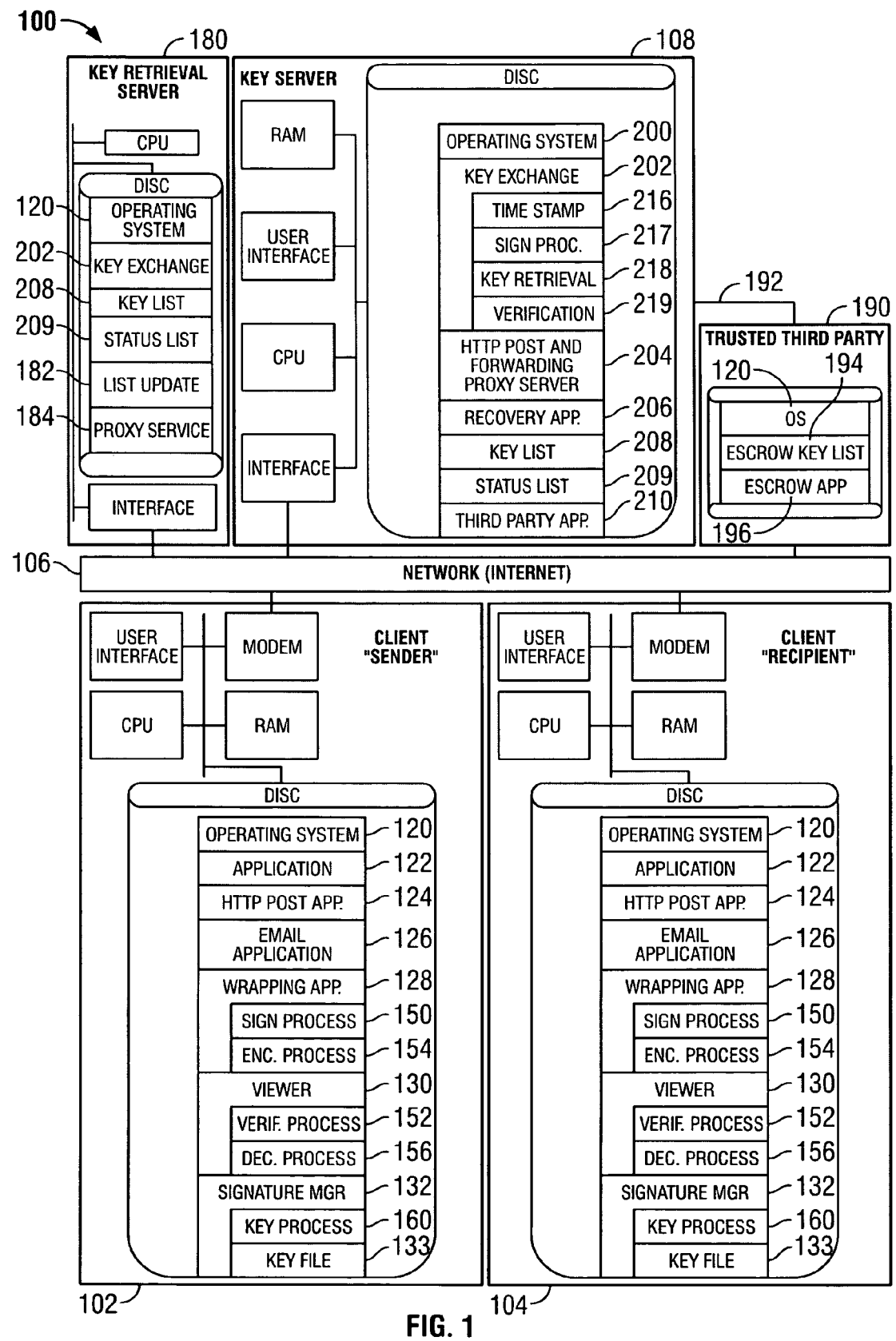
FIG. 1 is a schematic block diagram of a computing network for facilitating a secure data exchange.

Most E-mail transmissions sent over the Internet are not secure. The contents of the transmission can be compromised by interlopers along the path traversed by the message when traveling from the sender to the recipient. The present invention provides a communication system for securely and easily generating, sending, viewing and verifying the authenticity of E-mail transmissions or other messages sent to a recipient over a network.

A number of terms are used herein to describe network transmissions and related structures and processes.

"Client" refers to a computer program that, among other functions, requests services from a server and more generally as the computer that runs a client program. Here, a client program includes a communication program for sending electronic messages (such as E-mail) to other clients through a network, or for interpreting messages from other clients.

"Server" refers to a computer program that provides services to clients, and more generally refers to a computer that runs a server program. "Key Server" refers to a computer that includes a server program for maintaining, validating and providing keys for use by clients in transmitting secure E-mail or other messages over a network.

"Key Server Certificate" is a certificate that certifies a public key of the key server and is signed by a plurality of private keys (e.g., four private keys) corresponding to a like plurality of known public keys (e.g., four public keys).

"Exchange" refers to a communication between a client and a server over a network. The exchange occurs along a connection path between client and server and includes a request (generated by the client) and a response (from the specified server). Requests and responses can be generated by each of the client and server depending on the exchange.

"Secure transmission" or "Secure E-mail transmission" refers to a secure communication between clients over a network. Such a communication includes a wrapper, a message, a signature, a time stamp certificate and, optionally, a return receipt or certified return receipt. The wrapper is received by a recipient's conventional E-mail service. The message, signature and time stamp can be recovered and verified by invoking a secure message viewer at the recipient client computer.

"Network" refers to a private or public network. Private networks include an intranet, that is, a network connecting one or more private servers such as a local area network (LAN). Alternatively, the network can be a public network, such as the Internet, in which data is passed over untrusted communication links. The network configuration can include a combination of public and private networks. For example, two or more LAN's can be coupled together with individual terminals using a public network such as the Internet.

"Internet" refers to all of the networks that use the TCP/IP suite, which cooperate to form a seamless network for their collective users. The invention has particular applicability to exchanges on the Internet between clients. However, other exchanges over other networks can also benefit from the secure transmission features disclosed herein.

"Encryption" refers to a process of encoding a document to hide its content from anyone except an intended recipient. "Decryption" refers to the reciprocal process of recovering the original document by a recipient. Two encryption protocols are used and described in greater detail below: symmetric key encryption and public key encryption. "Symmetric key encryption" refers to an encryption method in which the encipher key and the decipher key are the same. In one implementation, DES or Triple DES encryption is used for symmetric key encryption. "Public key encryption" refers to an encryption method in which the encipher key and decipher key are different. The encipher key can be made public to alleviate difficulty of a symmetric key exchange between the sender and recipient. In one implementation, a variation of the Rabin public key encryption algorithm is used to encrypt a randomly generated symmetric key, and then the symmetric key is used to encrypt a given message using DES or Triple DES encryption. The phrases "encrypted by the (recipient's) public key" and "decrypted using the (recipient's) private key" refer to steps implemented when using public key encryption. The phrases "encrypted by a session key" and "decrypted by a session key" refer to steps implemented when using symmetric key encryption.

"Signature" refers to a designator that is attached to a document that can be verified to authenticate the originator and the integrity of the document. In one implementation, a variation of the Rabin digital signature algorithm is used. "Signature phrase" is a password or pass phrase used to encrypt the private key to be stored on the user's computer. The signature phrase is used to derive a symmetric key which in turn is used to encrypt private key data. "Signing" or "signed" refer to a specific operation that is applied to a document, message or string to produce a verifiable form of a signature. "Signature Verification" is the reciprocal process for validating the signature produced by the signing process.

A "Time Stamp Certificate," as used herein, refers to a certificate signed by a central server (e.g., key server or key retrieval server) that is attached to a message. The time stamp certificate certifies the sender, the recipient, the time the message was sent, the public key of the sender, and the public key of the recipient. In one implementation, the time stamp certificate includes the following items:

1) the sender's E-mail address (or its hash);
2) the recipient's E-mail address (or its hash);
3) the time the message was sent;
4) a hash of the message;
5) a hash of the public key of the sender and its status; and
6) a hash of the public key of the recipient and its status.
7) key server certificate Referring now to FIG. 1, an interconnected computing system 100 for facilitating communication between two client computers (e.g., a "sender" 102 and a "recipient" 104) over network (Internet) 106 is shown. A key server 108 is also coupled to network 106 and can be accessed by each of sender 102 and recipient 104. One or more key retrieval servers 180 are also coupled to network 106 and can be accessed by each of sender 102, recipient 104 and key servers 108. A trusted third party server 190 is coupled to key server 108 through a direct connection 192 or a secure Internet connection through network 106.

Sender 102 and recipient 104 each include an operating system 120 and one or more applications 122 executing on the client computers. In addition, sender 102 and recipient 104 each include a HTTP post application 124, an E-mail application 126, a secure E-mail wrapping application 128, a viewer 130 and signature manager 132, for sending and receiving secure transmissions over network 106.

HTTP post application 124 can include an HTTP protocol. The HTTP protocol allows wrapping application 128 or viewer 130 to directly access key server 108 or key retrieval servers 180 via the network 106. The HTTP protocol can also be used to transmit a secure message to a forwarding server if the sender does not have access to an SMTP server. A process for sending secure messages using HTTP posts is described in greater detail below.

E-mail application 126 can be any generic E-mail application that allows MIME attachments. Examples include CCMail, Netscape Communicator and Microsoft Outlook.

A secure E-mail composing and wrapping application (hereinafter, "wrapping application) 128 can be invoked to wrap a secure E-mail and apply a signature that can be verified by a recipient. Wrapping application 128 includes a signing process 150 and encryption process 154. Signing process 150 receives as an input a user signature phrase which is used to decrypt the user's private keys. The private keys are used to sign a message to produce a signed message. Encryption process 154 operates on the signed message to produce an encrypted message. The processes of signing and encrypting a message are described in greater detail below.

Viewer 130 can be called from E-mail application 126 and used to view a secure E-mail transmission. Viewer 130 includes a verification process 152 and decryption process 156. Decryption process 156 decodes encrypted messages produced using encryption process 154. After decryption, verification process 152 can be invoked to authenticate signatures produced using signing process 150. In one implementation, wrapping application 128 and viewer 130 are bundled in a single application.

Signature manager 132 is a utility for managing digital signatures for a user. Prior to the use of wrapping application 128 or viewer 130, each user must generate public and private keys. Signature manager 132 includes methods for generating public and private keys. Signature manager 132 submits the public key to key server 108 for publication. Key server 108 publishes the public keys in a key list which in turn can be distributed to key retrieval servers 180. In addition, signature manager 132 can submit an encrypted version of the private key and recovery data to key server 108 to support key escrow and key recovery procedures. Following escrow, signature manager 132 stores the private key locally. Key escrow and key recovery are discussed in greater detail below. Signature manager 132 can be used to create new keys, change keys, delete keys or change signature phrases. Signature manager 132 includes key process 160 for creating and storing private and public keys for use in transmitting secure E-mail. Signature manager 132 stores a user's private key(s) in a key file 133. This storage, referred to as a key file, may contain a plurality of keys stored for an E-mail address. The key file may be transferred from a user's computer to another computer to allow a user to send and receive secure E-mail messages on a computer other than the computer used to create the private key. The private key is encrypted using a symmetric key derived from the signature phrase. Only persons having the correct signature phrase can recover a user's private key. Signature manager 132 can also be bundled into another application.

Network 106 can be the Internet, an intranet or a combination of public and private networks.

Key server 108 can be a server computer executing one or more server programs. Key server 108 includes one or more server applications executing on the server computer and includes an operating system 200, key exchange application 202, HTTP post and forwarding proxy server application 204, recovery application 206, key list 208, status list 209 and trusted third party (TTP) application 210. In one implementation, key server 108 and key retrieval server 180 are the same server.

Key exchange application 202 operates to retrieve recipient and sender public keys, as well as public key status. The sender uses wrapping application 128 to retrieve the recipient's public key to encrypt a message so that only the recipient can read it. The recipient uses viewer 130 to retrieve the status of the correct public key of the sender so as to verify the integrity of the message and attached signature received from the sender. The exchanges between clients and key server 108 can themselves be secure as is described in greater detail below. Key exchange application 202 includes time stamp process 216, server signing process 217, key retrieval process 218 and server status verification process 219.

Signature time stamp process ("stamp" process) 216 is invoked when the sender retrieves the recipient's public key. In one implementation, the time stamp is signed by the server (producing a time stamp certificate) making the time stamp difficult to forge. The time stamp certificate can be included in the secure message sent by the sender to indicate irrefutably the time the message was sent to the recipient.

Server signing process 217 can be invoked by key server 108 to sign public keys stored in key list 208 with the private key of the server. In addition, server signing process can be used to sign messages transmitted back to a client including signing a time stamp to create a time stamp certificate.

Key retrieval process 218 is invoked when a sender retrieves public keys of a recipient from key list 208. The public keys in key list 208 can be indexed by E-mail address and by a hash produced from an E-mail address. A second list, a status list 209, is maintained by key server 108. Status list 209 can be indexed by a key identifier (ID), which is generated by taking a hash of an associated public key. Hash functions are described in greater detail below. Each entry in the status list includes a key ID, an associated E-mail address, a current status field and a valid time field. The current status field indicates the status of the public key, such as active, inactive (awaiting escrow or awaiting confirmation), suspended, removed, hidden or deleted. The valid time field indicates the date and time span over which the public key was (is) valid. Status list 209 includes all keys currently in key list 208 as well as all keys that have been deactivated, suspended, removed, hidden or deleted.

Server status verification process 219 is invoked by the recipient of a secure message to check the status of the message sender's public key.

HTTP post and forwarding proxy server application 204 provides an easy means of transmitting messages without requiring a sender to have access to a SMTP server. The HTTP post application in the client application sends the secure message by HTTP post to a forwarding proxy. In one implementation, key server 108 includes a HTTP and forwarding proxy server application 204 which is used to recover the secure message from the HTTP post and forward or otherwise relay the message as an attachment to a conventional E-mail message. In one implementation, a plurality of dedicated forwarding proxy servers are provided, each separated from the key server, where the number is set based upon system requirements.

Recovery application 206 is invoked by a user (sender 102 or recipient 104) and supports the recovery of the private key of the user in the event the private key is lost or the signature phrase is forgotten.

Key list 208 is a repository for public keys. In one implementation, public keys are indexed by the owner's E-mail address and the hash of the E-mail address. A public key can be retrieved by submitting either the E-mail address or the hash of the E-mail address for the recipient (or the sender, depending upon the public key to be retrieved). A public key (PK) for the recipient is retrieved at the time a secure E-mail message is created.

Trusted third party application 210 facilitates the transfer of private keys of users to a trusted third party. Trusted third party application 210 and key server 108 are not privy to the actual private key and only provide a conduit to trusted third party server 190 through direct connection 192 or through the Internet using a secure Internet connection. Other server connection arrangements can be used. Trusted third party application 210 is described in greater detail below in association with the key generation process.

Each of key retrieval servers 180 can be a server computer executing one or more server programs. Each key retrieval server 180 includes one or more server applications executing on the server computer. Key retrieval server 180 includes an operating system 120, a key exchange application 202, key list 208, status list 209 and list update process 182. In one implementation, key server 108 is a centralized server that maintains a master key list and status list that are published to each of the key retrieval servers 180. As such, key exchange application 202 can be removed from the central server (key server) and distributed to one or more local key retrieval servers 180. List update process 182 interfaces with key server 108 to maintain current key and status lists.

Key retrieval server 180 can also include forwarding proxy services 184 for forwarding HTTP posts from a sender to a recipient. The process for forwarding messages is described in greater detail below.

Trusted third party server 190 can be a server computer executing one or more server programs. Trusted third party server 190 includes one or more server applications executing on the server computer and includes escrow key list 194 and an escrow application 196. Trusted third party server 190 receives encrypted private keys forwarded by key server 108 received from users (sender and recipient 102 and 104). A user's private key data is encrypted, at the client, using the public key for the trusted third party. Private key data includes a private key and may include a user's E-mail address, public key and other data. The encrypted private key data is forwarded by key server 108 for escrow service (storage) to trusted third party server 190. Upon receipt, trusted third party server 190 invokes escrow application 196 which in turn decrypts the private key data, verifies the validity of the private key and returns a hash of the private key back to the user through key server 108. Trusted third party server 190 decrypts the encrypted private key data using its own private key to recover the user's private key data. After verification of the validity of the private key, trusted third party server 190 immediately encrypts the user's private key again using the public key of the beneficiary of the escrow service and stores the encrypted private key. The details of the escrow service are described in greater detail below with regard to FIG. 2e. In one implementation, trusted third party server 190 may be included within key server 108.

Figure 2A:
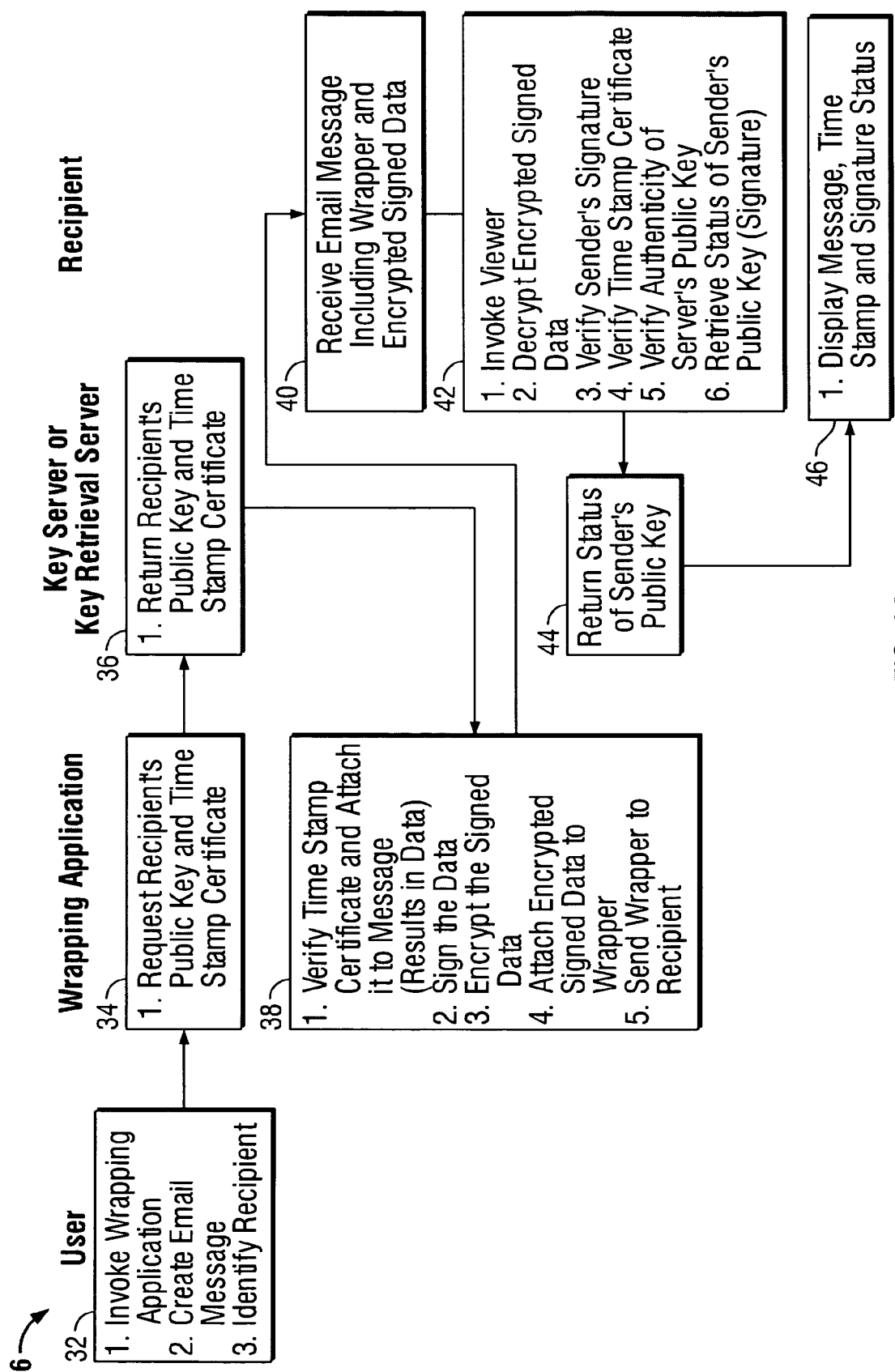
FIG. 2a shows a generalized process for securely sending and receiving encrypted E-mail over a network.

Referring now to FIGS. 1 and 2a, an overview of a process for secure transmissions between a sender and a recipient over a network is shown. The process described below includes numerous process steps that can be performed at various locations of the computing system. The description provided indicates a possible configuration for the computing system, and should not be construed as limiting. Prior to sending or receiving secure E-mail messages, an initial (initialization) process must be performed to generate public and private keys for the user. An initialization process will be described in greater detail later. The transmission process 6 begins with the user invoking wrapping application 128, creating a secure E-mail message and designating a recipient (32).

Wrapping application 128 requests the public key of the recipient and a time stamp certificate (34) from key server 108. Key server 108 obtains the sender's public key status from the status list 209 and the recipient's public key from the key list 208, generates a time stamp certificate, and returns these data to wrapping application 128 (36).

Wrapping application 128 performs a series of operations to complete the secure E-mail message construction including: verifying the time stamp certificate and attaching it to the E-mail message (forming data), signing the data, encrypting the signed data, attaching the encrypted signed data to a wrapper and sending the wrapper to the recipient (38).

The recipient receives the wrapper, including encrypted and signed data, through a conventional E-mail service (40). The recipient invokes viewer 130 which in turns performs a series of operations to process and display the secure E-mail message, including attached files if any. The process includes decrypting the encrypted signed data, verifying the sender's signature, verifying the time stamp certificate, verifying the authenticity of the server's public key and retrieving the status of the sender's public key (using the key ID) (42).

Key server 108 looks-up the status of the sender's public key and returns the status information to the recipient's viewer 130 (44). Thereafter, viewer 130 displays the decrypted message and time stamp along with the sender's public key (signature) status (46). In one implementation, the key status information returned from the key server can be signed and the key server signature can be verified. The individual processes executed by the sender and the recipient are described in greater detail below.

Figure 2B:
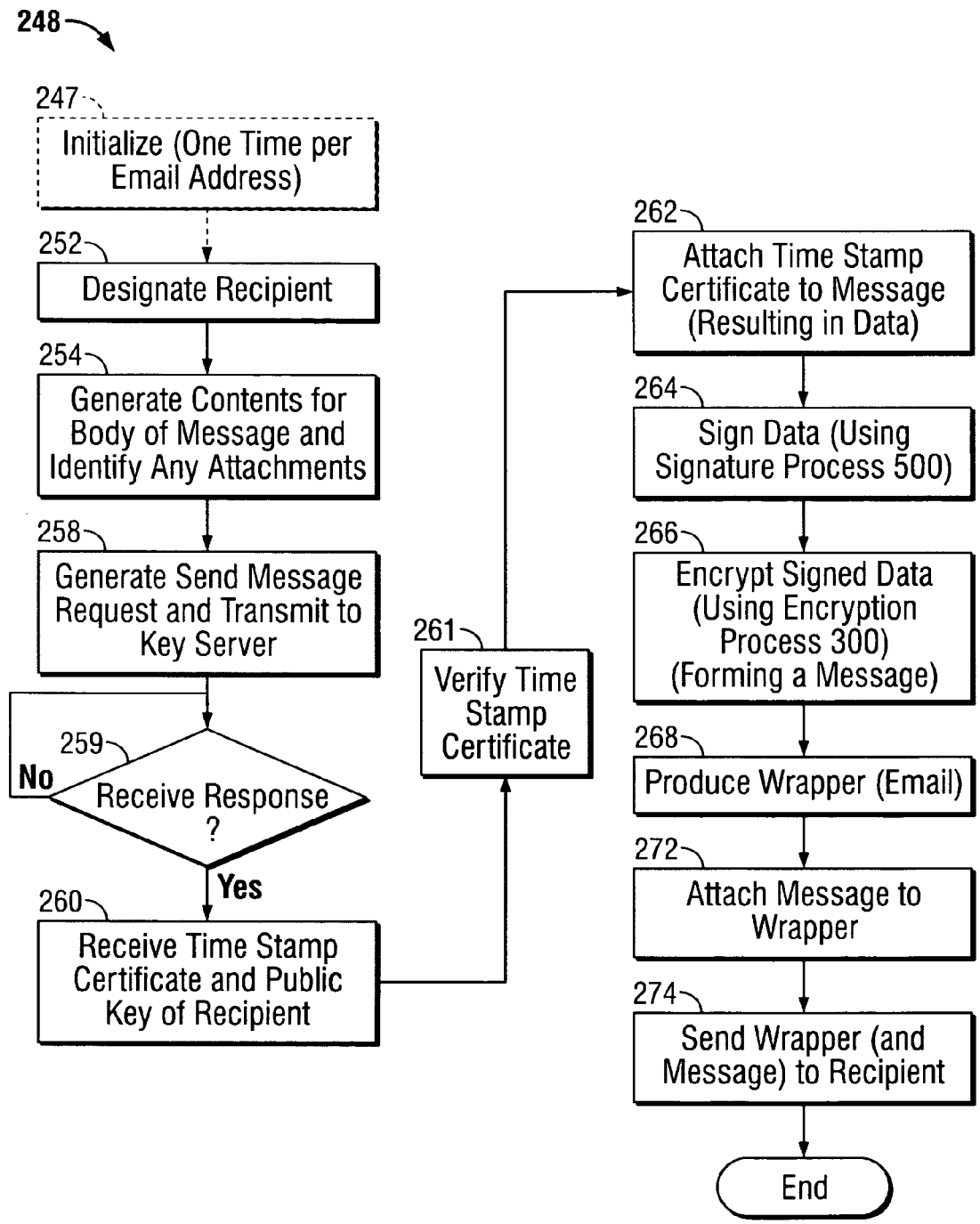
FIGS. 2b-2c show a flow diagram for a method of exchanging E-mail securely over a network between a sender and a recipient.
Figure 2C:
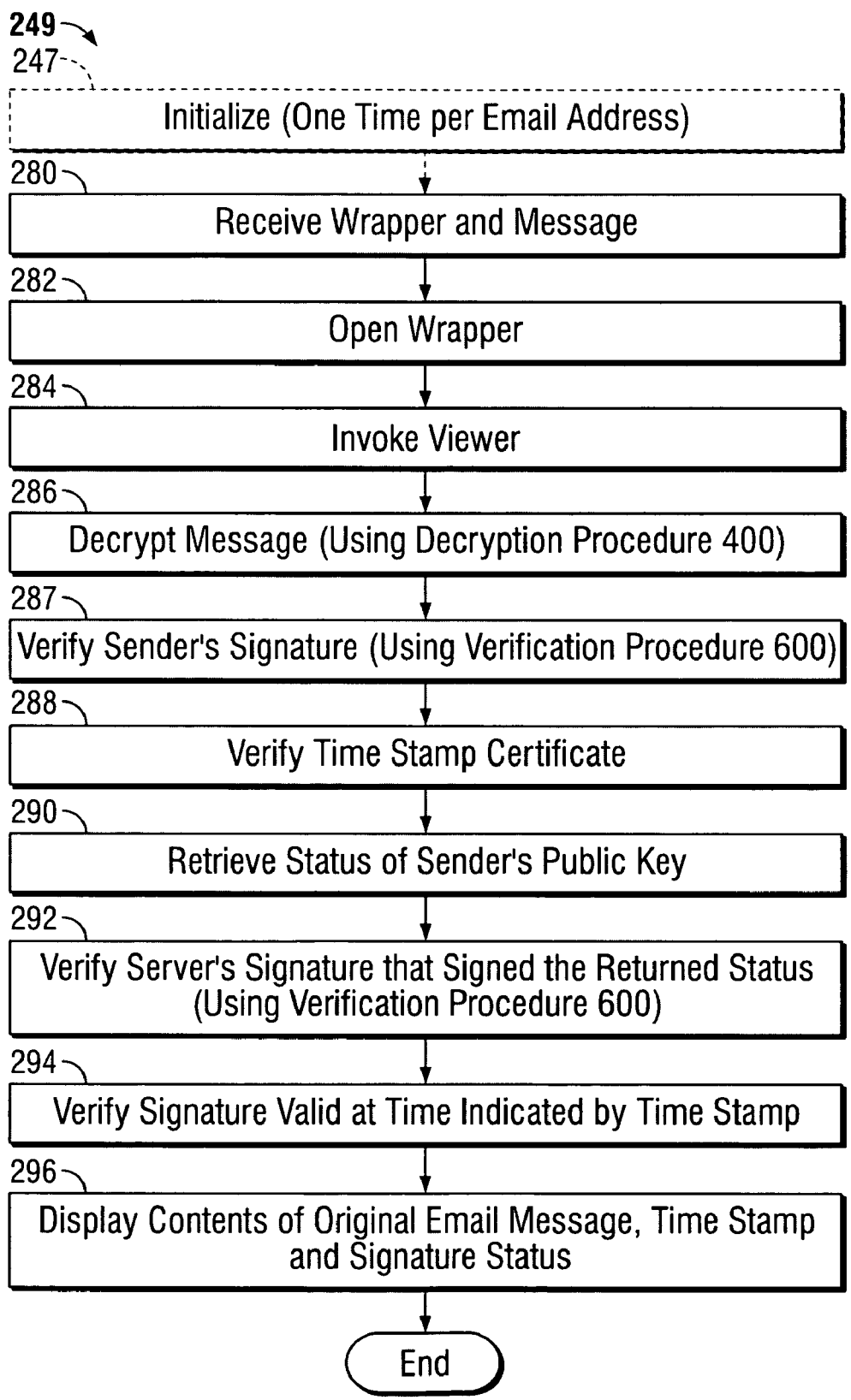

FIGS. 2b-2c show user and program steps for secure transmissions between sender 102 and recipient 104 of FIG. 1. The process includes complementary send and view processes 248 and 249 on FIGS. 2b and 2c, respectively. Prior to transmission of any secure messages, each of sender 102 and recipient 104 must perform an initial process (the "initialization process") 247. The initialization process includes the generation of public and private keys and the designation of a signature phrase. The public keys for all users are published at key server 108 for ready accessibility by other clients. The initialization process is only executed once, prior to sending or receiving secure E-mail messages. Once initialized, sender 102 can compose and send secure E-mail to any recipient 104 having a public key stored in key server 108. Similarly, after initialization, recipient 104 can receive and view secure E-mail from any sender having a public key stored in key server 108 and verify the authenticity of any secure E-mail message received. The process for generating and escrowing keys is described later in greater detail.

When a sender 102 desires to send a secure E-mail message to a recipient 104, send process 248 is invoked by sender 102. As noted above, prior to sending of messages (or receipt by a recipient) each user (sender and recipient) must perform initialization routine 247. As a reminder of this precondition, FIG. 2b shows an initialization step in phantom.

Referring to FIGS. 1 and 2b, send process 248 begins when wrapper application 128 is invoked which in turn requires the user to designate a recipient (252). The body of the E-mail message is produced and any attachments are identified (254). In one implementation, the message, including any attachments, optionally can be compressed. A send message request is generated by sender 102 and transmitted to key server 108 (258). The send message request includes the E-mail address (or hash of the E-mail address) of the recipient, the E-mail address (or hash of the E-mail address) of the sender and the hash of the message to be sent. When an identical message is to be broadcast to multiple recipients, the request can include the E-mail addresses (or hashes) of multiple recipients. Thereafter, the process waits for a response from key server 108 (259).

Assuming the recipient's E-mail address (or hash) is valid and locatable in the key server's key list and the key status is active, a time stamp certificate is received along with the public key of the recipient (260). The time stamp certificate serves several purposes, including: 1) establish that the message was sent from the sender to the recipient; 2) certify the time the message was sent; 3) authenticate the recipient's and the sender's public keys; and, 4) certify the status of these keys at the time the message was sent.

The time stamp certificate is verified (261) and then attached to the message, forming data (262). The time stamp certificate produced and signed by key server 108 cannot be altered or attached to another message without detection. The inclusion of the key server certificate in the time stamp certificate ensures that the server's public key is authentic. Key server process 216 for retrieving a public key and for generating a time stamp certificate is described in greater detail below with regard to FIG. 8a.

The data is signed using a signing process (264). The processes for verifying signed data and verifying the time stamp certificate will be described in greater detail below. The signed data is encrypted by the recipient's public key (producing an encrypted message) (266). The process of encrypting data using public key encryption will be described in greater detail below. A wrapper is produced that includes the recipient's E-mail address and an optional message body (268). The message body can include information from the key server 108 including: a message indicating that a secure E-mail message is attached, service updates or any other form of information including advertisements for services or products. The secure E-mail message is attached to the wrapper (272) and the wrapper and messenger are sent to the recipient (274). In one implementation, the wrapper is an SMTP wrapper.

View process 249 (FIG. 2b) includes numerous steps. As noted above, prior to receipt of messages (or transmission by a sender to a recipient) each user must perform an initialization routine 247. As a reminder of this precondition, FIG. 2c shows an initialization step (247) in phantom. View process 249 begins with the receipt of the wrapper and attached secure E-mail message (280). The wrapper is sent to the recipient using the recipient's E-mail address and arrives at the recipient's E-mail mailbox. The wrapper is opened using the recipient's conventional E-mail application (CCMail and the like). The recipient invokes viewer 130 to unwrap the document. More specifically, the recipient opens the wrapper (282) and clicks or double clicks on the attached secure E-mail message to invoke viewer 130 (284). Viewer 130 decrypts the encrypted message included within the attached secure E-mail message in accordance with decryption process 400 shown in FIG. 4 (286). Viewer 130 verifies the sender's signature (287) and the time stamp certificate (TSC) (288) using the verification processes to be described later.

The status of the sender's public key is retrieved from key server 108 or key retrieval server 180 (290) (to find out whether the sender's public key is still active at the viewing time). The processes for verifying and determining the status of a public key will be described in greater detail below. Viewer 130 verifies the server's public key that signed the status information using the verification procedure 600 in (FIG. 6a) (292) and verifies that the public key of the sender was valid at the time indicated by the date stamp when the message was sent (294). In one implementation, a signed time stamp certificate is retrieved which includes the status of the sender. In a different implementation, the status information is returned unsigned from the key server 108. Finally, the original contents of the E-mail message, the TSC and the signature status is displayed (296). Thereafter, the process ends.

Figure 2D:
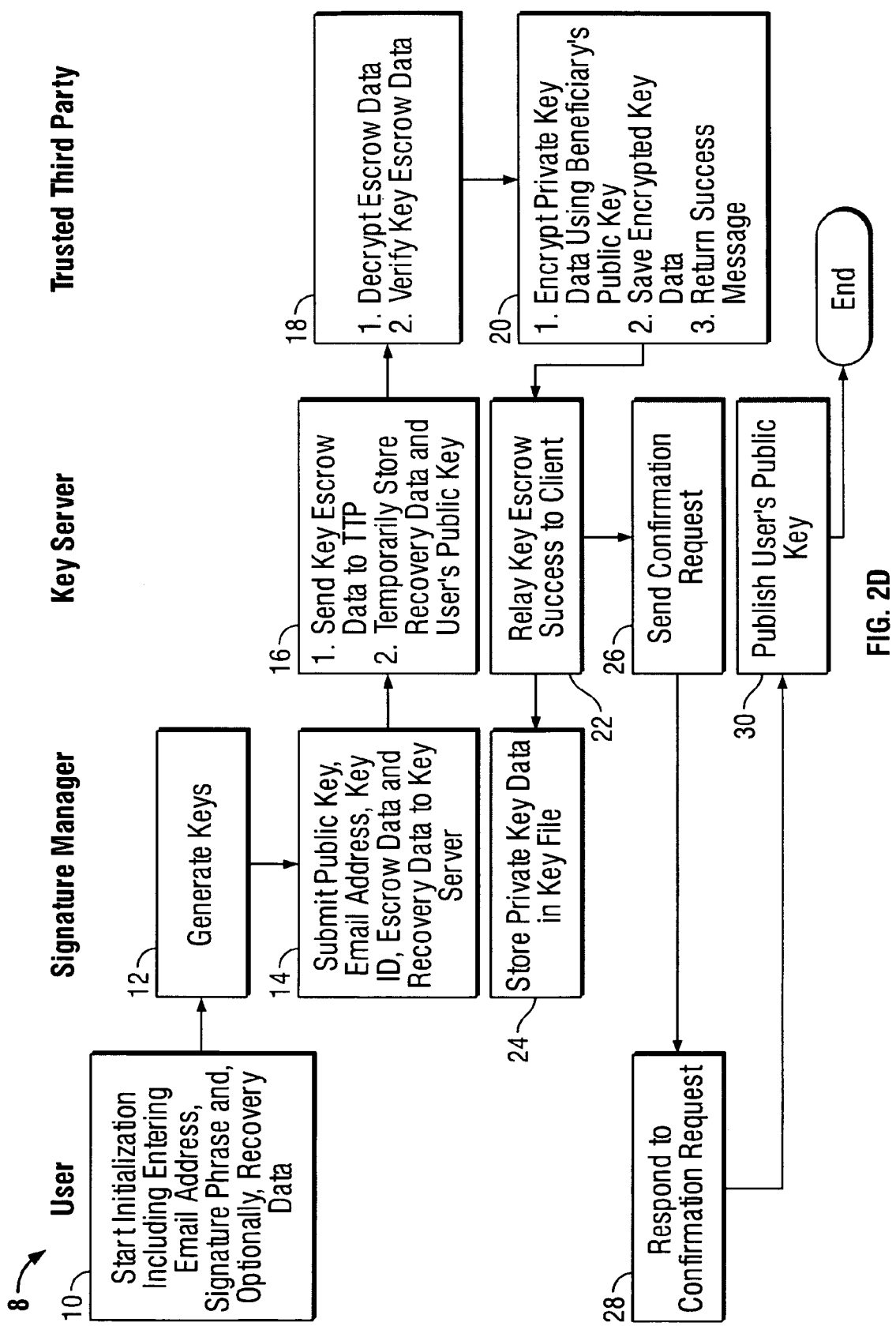
FIG. 2d shows a generalized process for initializing a user to transmit or receive secure E-mail.

Referring now to FIGS. 1 and 2*d*, an overview of an initialization process for secure transmissions between a sender and a recipient over a network is shown. The process described below includes numerous process steps that can be performed at various locations of the computing system. The description provided indicates a possible configuration for the computing system, and should not be construed as limiting. Prior to sending or receiving secure E-mail messages, an initial process must be performed to generate public and private keys for the user. Initialization process 8 begins with the user entering an E-mail address, a signature phrase and, optionally, recovery data (10).

Signature manager 132 generates public and private keys (12). The public key, E-mail address, a key ID (hash of the public key), encrypted escrow data (including the user's encrypted private key) and recovery data (if any) are sent to key server 108 (14). Key server 108 sends the escrow data to trusted third party server 190 and temporarily stores the user's public key and recovery data (16).

Trusted third party server 190 decrypts and verifies the key escrow data (18) to ensure that the public key to be stored by key server 108 matches the private key. Thereafter, trusted third party server 190 encrypts the private key using the public key of the beneficiary of the escrow service, saves the encrypted private key data and returns a successful escrow message to key server 108 (20)

Key server 108 relays the successful escrow message to the client (user) (22) which in turn stores the private key data (24). Key server 108 sends a confirmation request to the E-mail address of the owner of the public key (26). When a confirmation request is responded to by the user (owner) (28), the user's public key is published by key server 108 (30).

Referring now to FIGS. 1 and 2*e-h*, initialization step 247 includes numerous individual steps. Initialization step 247 (FIGS. 2*b* and 2*c*) is completed by a user prior to sending or receiving secure E-mail messages. The process includes processes executing on each user computer (sender or receiver 102 or 104) (process steps 220-245 shown in FIGS. 2*e* and 2*f*), key server 108 (process steps 50-78 shown in FIG. 2*g*) and trusted third party server 190 (process steps 80-98 shown in FIG. 2*h*). The process begins by invoking signature manager 132 to generate public and private keys for the user including invoking key process 160 (220).

Signature manager 132 prompts the user for a signature phrase (221). The signature phrase can be a word, a number or grouping of words and numbers. Ideally, the signature phrase should be maintained in confidence to ensure that unauthorized access to a user's computer will not enable discovery of the private key.

After the signature phrase is entered, a random number is generated (222). In one implementation, the random number is generated locally on a user's computer. In an alternative implementation, a first portion of the random number is produced by key server 108 and second portion is generated locally by the user. A hash function is applied to the two portions (the portions are mixed) to produce the random number. Using the random number as an initial seed, two large prime numbers are generated (223). A number of screening tests can be executed to ensure the generation of a large prime. In one implementation, the prime number generator continues to generate pseudo-random numbers from the random seed until a prime is located that has both the highest and lowest bits set and passes seven rounds of the Rabin-Miller primarity tests. Each candidate prime can be subjected to divisibility tests by all prime numbers having values less than two thousand. The use of divisibility tests can be a pre-screen to the Rabin-Miller tests to speed the identification process.

After the identification of the large primes, a pre-computation step is performed producing pre-computed data terms a and b to speed the signing and decryption process (the square root function steps) (224). In one implementation, terms a and b are computed using an Extended Euclidian Algorithm such that:

$$ap+bq=1,$$

where p and q are the two prime numbers (derived in step 223).

The a and b terms are used to speed the calculations required during the verification and signing processes. As such, their generation is only performance enhancing and not strictly required.

The two large prime numbers are the user's private key. The public key is the product of the two large prime numbers. The two primes are multiplied (226) and the product, the public key, is packed (producing packed data) (227). The size of the two large primes and the public key can be variable.

The server's public key and trusted third party public keys are retrieved (228). In one implementation, a server public key package is retrieved which includes three separate keys: PK1, TTPK1 and TTPK2.

PK1 is a public key for key server 108. TTPK1 and TTPK2 are public keys for a trusted third party for use in escrowing the private key of the sender at trusted third party server 190. The trusted third party keys (TTPK1 and TTPK2) are used by trusted third party server 190 to encrypt the private key provided by a user (229). In one implementation, the server's public key (PK1) and third party keys (TTPK1, TTPK2) returned from key server 108 are signed by four separate private keys. The four signatures can be verified by invoking the verification process 600 (FIG. 6*a*) four times to ensure that PK1, TTPK1 and TTPK2 are authentic.

The public keys for these four separate private keys are included with each wrapping application 128, viewer 130 and signature manager 132. In one implementation, the four separate public keys are hardwired into the code for each application. In a different implementation, the four separate public keys can be updated by key server 108.

The trusted third party keys are used to encrypt the sender's private key producing key escrow data (232). In one implementation, the private key is combined along with the public key and encrypted using TTPK1 and then encrypted again using TTPK2. Mathematically this process can be represented by:

KeyEscrow Data=PKE (TTPK2, PKE (TTPK1, private key+public key)), where PKE (PublicKey, data) is a notation for data encrypted by PublicKey, private key is the private key of the user, and public key is the public key of the user.

The key escrow data is packed producing Packed data (230). In one implementation, a user generating a pair of public and private keys may elect a recovery option. The sender can be prompted for a recovery question and the answer to the recovery question. A user who remembers the answer to the question can recover the user's private key with a process to be described below.

Figure 2E:
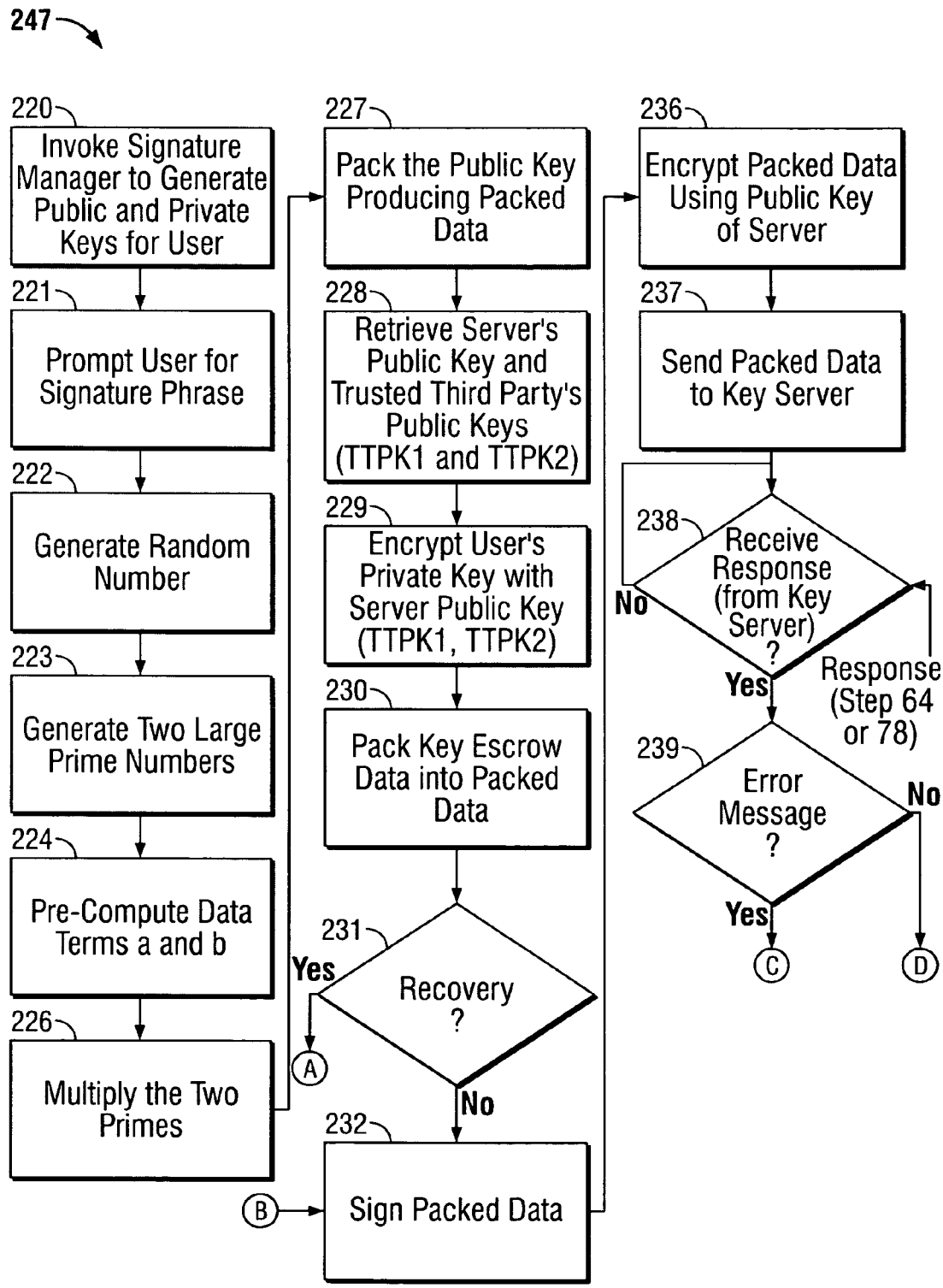
FIGS. 2e-2h are flow diagrams for the initialization process required to generate and escrow private keys.
Figure 2F:
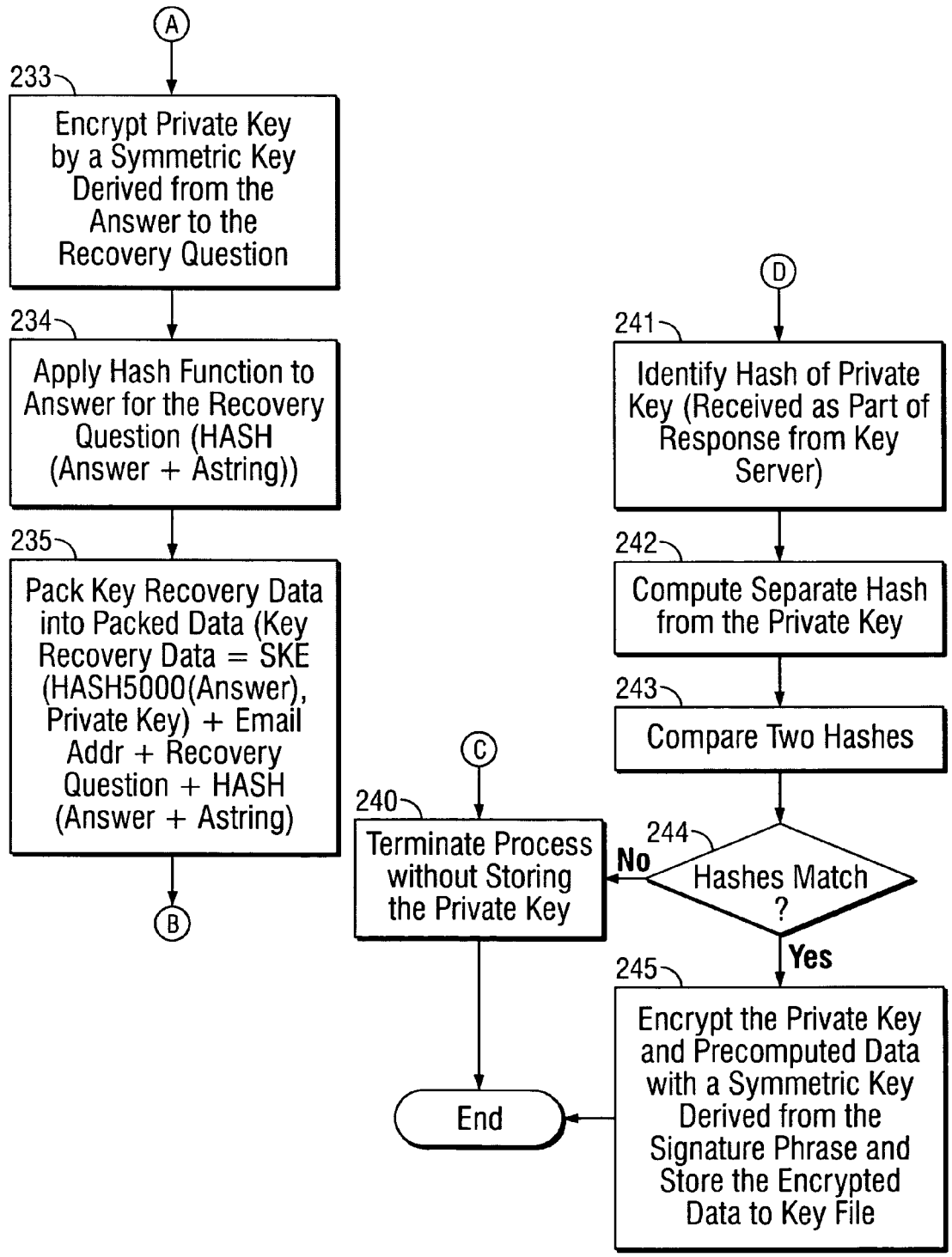

If the user has selected the key recovery option (231), process A shown in FIG. 2*f* is invoked whereby the private key is encrypted by a symmetric key derived from the answer to the recovery question (233). In one implementation, a symmetric key is derived from the recovery answer using a large number of hash functions. In one implementation, the recovery answer is passed through five thousand hashes to derive the symmetric key (denoted HASH5000(ANSWER)). The application of a large number of hash functions to the answer makes "dictionary attacks" ineffective due to time considerations.

To avoid exposure of the recovery answer at the key server, the recovery answer is never sent in cleartext to key server 108, only a hash of the answer, as modified below, is sent (234).

In one implementation, a constant string is added to the answer prior to the application of the hash function. The addition of the constant string prior to the hash impedes easy attacks when attempting to derive the symmetric key from the hashed recovery answer (denoted HASH (ANSWER+Astring) where Astring denotes the constant string).

The key recovery data is packed into the Packed data (235). The recovery data consists of the encrypted private key (as described below and denoted by: SKE (HASH5000(ANSWER), private key)), the E-mail address of the user, the recovery question and the hash of the answer [HASH (ANSWER+Astring)].

Returning to FIG. 2e, the Packed data is signed by the private key (232), encrypted by the public key of key server 108 (236) and sent to key server 108 (237). The user waits for a response from the key server (238).

Key server 108 invokes its portion of the key generation process starting at step 50 (FIG. 2g) upon receipt of a package (Packed data) from a user. The data submitted as part of the package is decrypted using the private key for the key server to recover the Packed data (52). The signature that is part of the Packed data is verified (54). More specifically, key server 108 verifies that the public key included as part of the Packed data matches the public key recovered in the signature verification process [(Signed (public key, Packed data)) derived in step 237) shown in FIG. 2e]. If the signature is verified (56), then the public key and the key recovery data (if any) are stored temporarily and their status is set to "awaiting escrow" (58). The awaiting escrow status indicates that the signature for the package was valid and the rest of the escrow process is continuing. The status of the recovery data is maintained along with the recovery data in a recovery database. In one implementation, the recovery database is indexed by the owner's E-mail address or the hash of the E-mail address. The public keys are stored in key list 208. The status for the public keys is stored in the status list 209. If the signature is not verified, then an error message is returned to the user (78). The public key of the user and the key escrow data is sent to trusted third party server 190 (60) and the process waits for a reply from the trusted third party server (61).

Trusted third party server 190 invokes its portion of the key generation process starting at step 80 (FIG. 2h) when a package including the public key and encrypted private key data for escrow is received. The encrypted key escrow data included in the package is decrypted using the private key of the TTP to recover the key escrow data (82). The private key with the public key are checked for consistency (the public key should be the product of the two prime numbers that make up the private key) (86). If the keys are not consistent, an error message is returned to key server 108 (88). Otherwise a hash function is applied to the private key (90). The private key is encrypted with the public key of the beneficiary of the escrow (92) and stored (94). In one implementation, all the private key data (private key, public key, E-mail address and other information) is encrypted with the public key of the beneficiary of the escrow and stored as escrow data. A successful escrow message is generated (96). The successful escrow message and the hashed private key (generated in step 90) are returned to key server 108 (98) and the third party portion of the process is complete.

As indicated above, the sub-steps in TTP server 190 are conducted by a highly secure process which is not to be swapped out and never stores intermediate results onto a disk. All data related to the private key in the memory is destroyed immediately after the private key is encrypted using the public key of the escrow beneficiary (producing encrypted private key data as described below and denoted: PKE(EscrowBeneficiaryKey, PrivateKeyData)) and stored. The encrypted private key data is stored in a safe place and maintained for the escrow beneficiary. The trusted third party cannot access escrowed private key data because it is encrypted by the escrow beneficiary's key. Moreover, the escrow beneficiary cannot directly access escrowed private key data because the escrowed private key data is stored by the trusted third party.

Returning to the key server process portion (FIG. 2g), if key server 108 receives an error message (62), the E-mail address, public key as well as key recovery data (if any) is deleted from the database (key list 208 and status list 209 as well as the recovery data base) (68) and an error message is returned to the user (78). If an escrow successful message is received, the status of the recovery data and the private key (as indicated in the status list) is changed to "awaiting confirmation" (63). The awaiting confirmation status indicates that the private key has been successfully escrowed and the process is waiting for a response from the owner of the E-mail address associated with the private key data. The successful escrow message along with the hash of the private key from the TTP is relayed to the user (by HTTP response) (64). A confirmation request E-mail is generated and sent to the E-mail address of the owner of the public key (65). Thereafter, the process waits for a confirmation back from the owner (66).

The process at the user's client computer (the signature manager process) continues (FIG. 2e) upon receipt of an error message or escrow successful message. If an error message is received (239), the process terminates and no keys are stored (240) (FIG. 2f).

If signature manager 132 receives a successful message from key server 108 which includes a hash of the private key (241), it computes a separate hash from the private key (242). Signature manager 132 then compares the computed hash with received hash (243). If the two hashes match (244), signature manager 132 stores the private key and pre-computed data (which is considered part of the private key) locally (to the disk on the client computer) encrypted by a symmetric key derived from the signature phrase (245). More specifically, a one-way hash function is applied to the signature phrase a large number of times to produce a symmetric key which is in turn used to encrypt the private key. The private key can be recovered using the signature phrase and a decryption process. Thereafter, the signature manager portion of the user process ends.

When the owner of the E-mail address receives an E-mail confirmation request from key server 108, the owner can respond to the key server. The owner may positively respond by sending a confirmation to key server 108. If the owner did not request key publishing, the owner can return a negative response and the key server will not publish the newly generated public key. If a confirmation is not received within a predefined time-out period, the key server will interpret the lack of response in the negative and will again not publish the public key. The confirmation/response can be generated by clicking a hyperlink on the confirmation request, sending an E-mail reply, or, in one implementation, by calling a telephone number (such as a toll free 800 or 888 number) and entering a secret confirmation number. This confirms that the user who has generated the key is the owner of the corresponding E-mail address. This concludes the user portion of the key generation and escrow process.

Figure 2G:
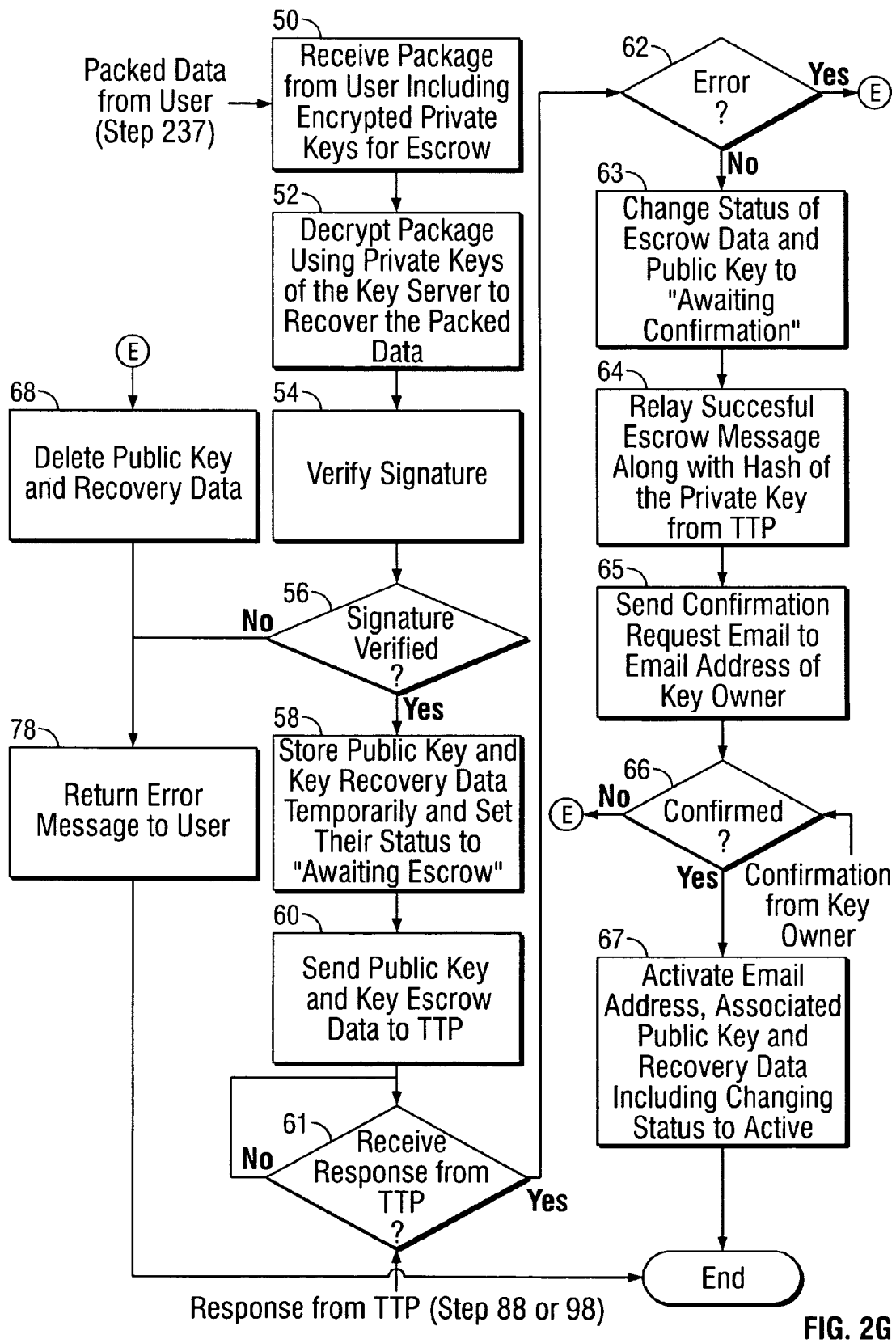
Figure 2H:
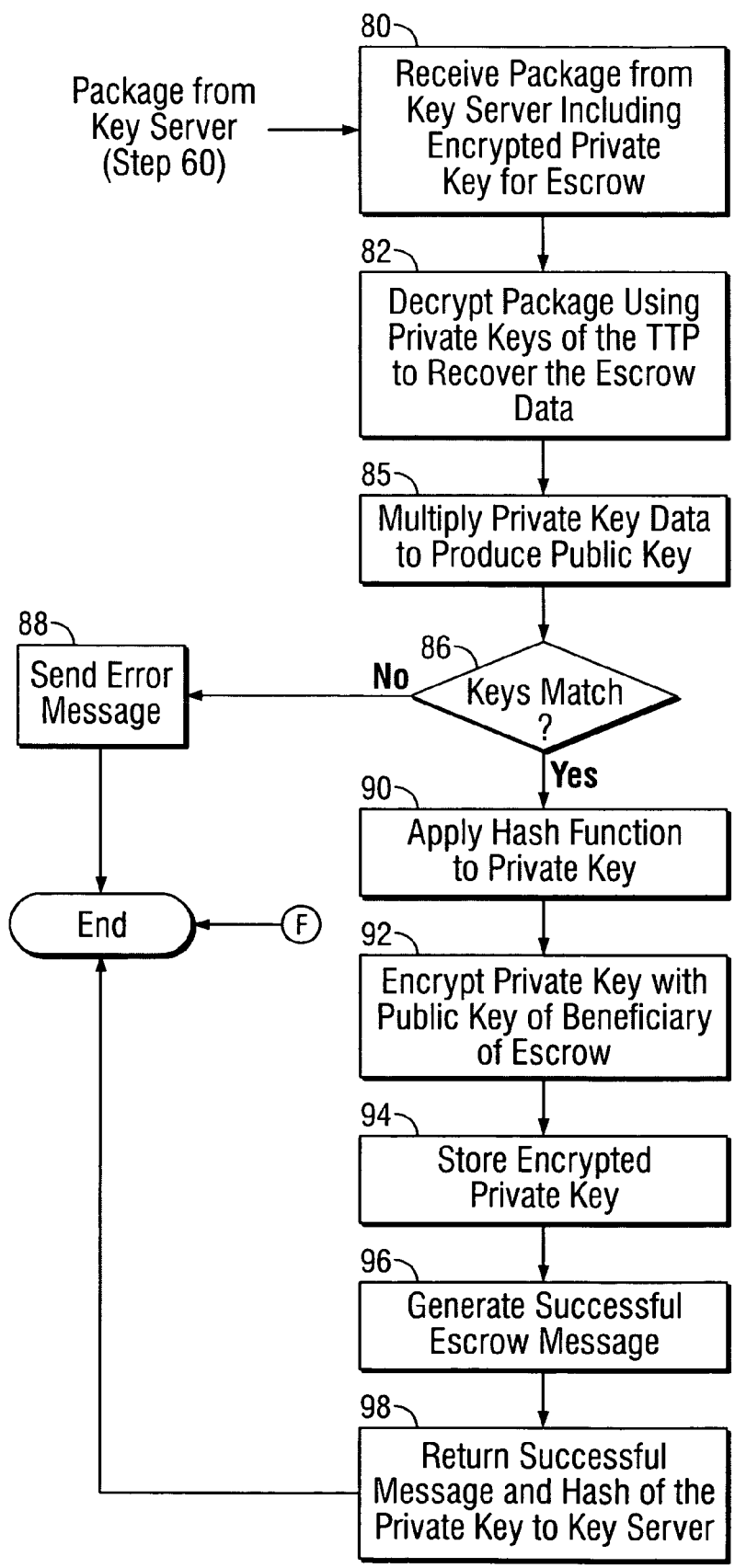

If the user's response to the confirmation E-mail is positive, the public key of the user is activated in key server 108. More specifically, key server 108 receives the user's response to the confirmation E-mail at step 66 (FIG. 2g). If the response to the confirmation E-mail is positive, the E-mail address and the public key are stored (along with the recovery data) and the public key is activated (made available for retrieval), including changing the status of the public key to active (67). The stored data can be organized in a table indexed by both the E-mail address or the hash of the E-mail address associated with a given public key. In addition, a key status can be retrieved according to a key ID (which is a hash of the public key). The process for generating signatures and the key ID will be described in greater detail below.

To ensure the authenticity of the public keys retrieved, in one implementation, the public keys stored in the database are signed by a key server (PK1) and the key server is in turn validated by a certificate (key server certificate) signed by the private keys corresponding to the four known public keys. When a public key is retrieved, the server's signature and the key server certificate can be verified to ensure that the data originated from the server. The signature and certificate can be verified by viewer 130 and signature manager 132 to ensure the authenticity of the data retrieved.

If the response to the confirmation is negative, however, the E-mail address, the public key and any recovery data are deleted (68) and the process ends.

The send and receive processes described above include numerous process steps. At least eight general processes are invoked by one or more of the clients and the key server in the secure transmission including: symmetric key encryption, hashing, HASH5000, public key encryption, public key decryption, a signature process, a signature verification process and a time stamp verification process. Each of these processes will be described in detail below.

Symmetric Key Encryption

Symmetric key encryption, denoted by SKE (key, data), can be any encryption algorithm in which the encipher key and decipher key are the same or can be easily derived from one to the other. In one implementation, a standard 168-bit triple data encryption standard (Triple-DES) encryption algorithm is used for symmetric key encryption. A 168-bit session key is both the encipher and decipher key. Decryption is the reverse of the Triple-DES algorithm using the same session key.

Hashing

Hashing, denoted by HASH (string), refers to a process of applying a one-way hash function to the string. In one implementation, a message digest five (MD5) hash function is applied and produces a 128-bit number.

HASH5000

HASH5000, denoted by HASH5000(string), refers to a process in which the hash function is applied to the string a large number of times to obtain a symmetric key. In one implementation, the number of times is five thousand.

Public Key Encryption

Figure 3:
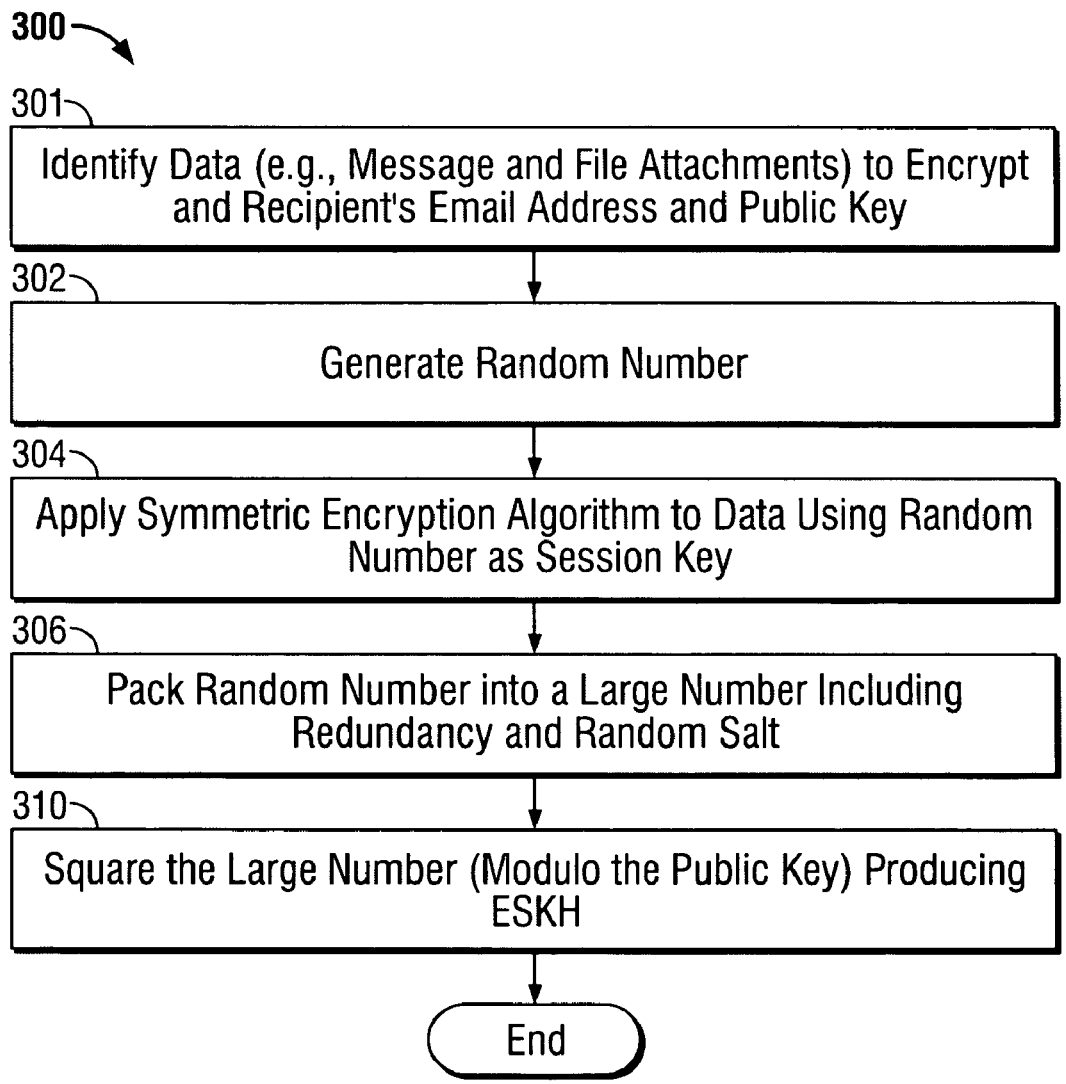
FIG. 3 is a flow diagram for a public key encryption process.

Referring now to FIG. 3, an encryption process 300, denoted PKE(public key, data), for data is shown. The data (e.g., message including any attached files) to be encrypted and the public key and E-mail address of the recipient are identified (301). The data optionally can be compressed prior to encryption to save space and minimize transmission time. A random number (a session key) is generated (302). In one implementation, the random number is generated locally by capturing system messages in a user's computer. Symmetric key encryption is applied to the data using the random number generated in step 302 as a session key (304).

The random number session key is then packed into a large number (306). In one implementation, the large number can be variable in length and is sized to be large enough to contain an adequate amount of redundancy and random "salt". The salt consists of random bits that are packed along with the session key so that each time a given session key is packed, the resultant number produced is different. A modular square function is applied to the large number using the public key of the recipient as the modulus. More specifically, the large number is squared modulo the public key (multiplied by itself and divided by the public key), producing a remainder, that is referred to later as the encrypted symmetric key header (ESKH) (310). Thereafter, the process ends.

The encryption process described above is purely mathematical. When invoking the public key encryption process to encrypt data for transmission to the recipient, other steps can be included to assist in the validation and authentication processes invoked by the recipient. For example, in one implementation, a hash of the E-mail address of the owner of the public key (HASH (E-mail address)) and a hash of the public key used in the encryption, denoted HASH (public key) (the hash of the public key is referred to as the "key ID"), are produced and attached to the encrypted message. A data type identifier (ID) can be attached to the hashed E-mail address, the key ID, the ESKH and the encrypted message SKE (session key, message including file attachments), forming a package that is denoted by PKE (public key, data).

Decryption

Figure 4:
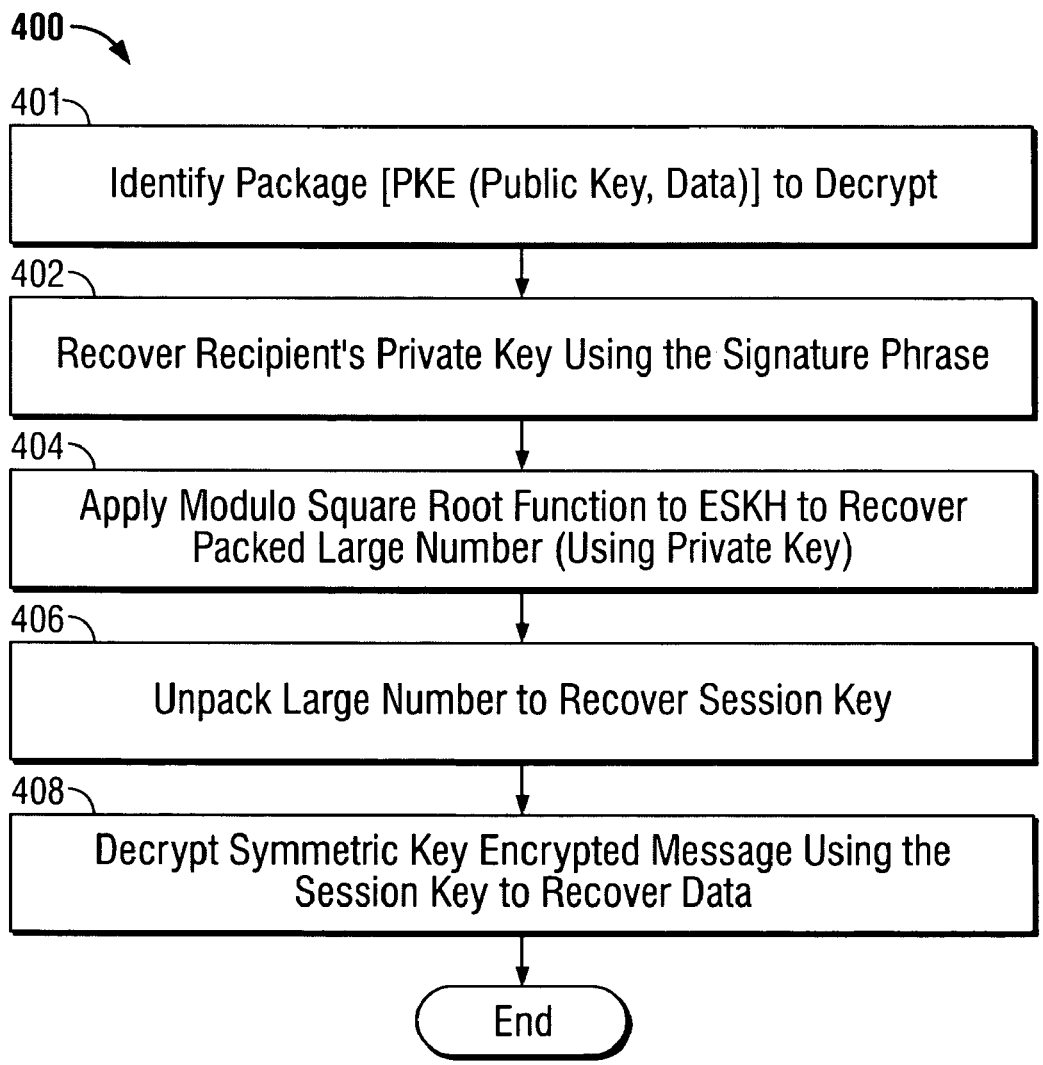
FIG. 4 is a flow diagram for a reciprocal decryption process associated with the process shown in FIG. 3.

Referring now to FIG. 4, a decryption process 400 is shown. The package to decrypt is identified (the package can include a data type ID, a key ID, a hashed E-mail address, an ESKH that contains the random symmetric key (session key) and a message encrypted by the symmetric key) (401). The recipient's private key is recovered using the correct signature phrase (402). A modulo square root function is applied to the ESKH to recover the original number (the packed large number) using the recovered private key (404). In one implementation, a modular square root function is applied as described in *Handbook of Applied Cryptography*, by Alfred J. Menezes, Paul C. Van Oorshot and Scott Vanstone, 2nd Edition, 1997, page 292, the contents of which are expressly incorporated herein by reference. The resultant packed large number is unpacked to recover the symmetric key (session key) (406). The session key can be used to decrypt the symmetric key encrypted message to recover the data (408). Thereafter, the process ends.

The Signing Process

Figure 5:
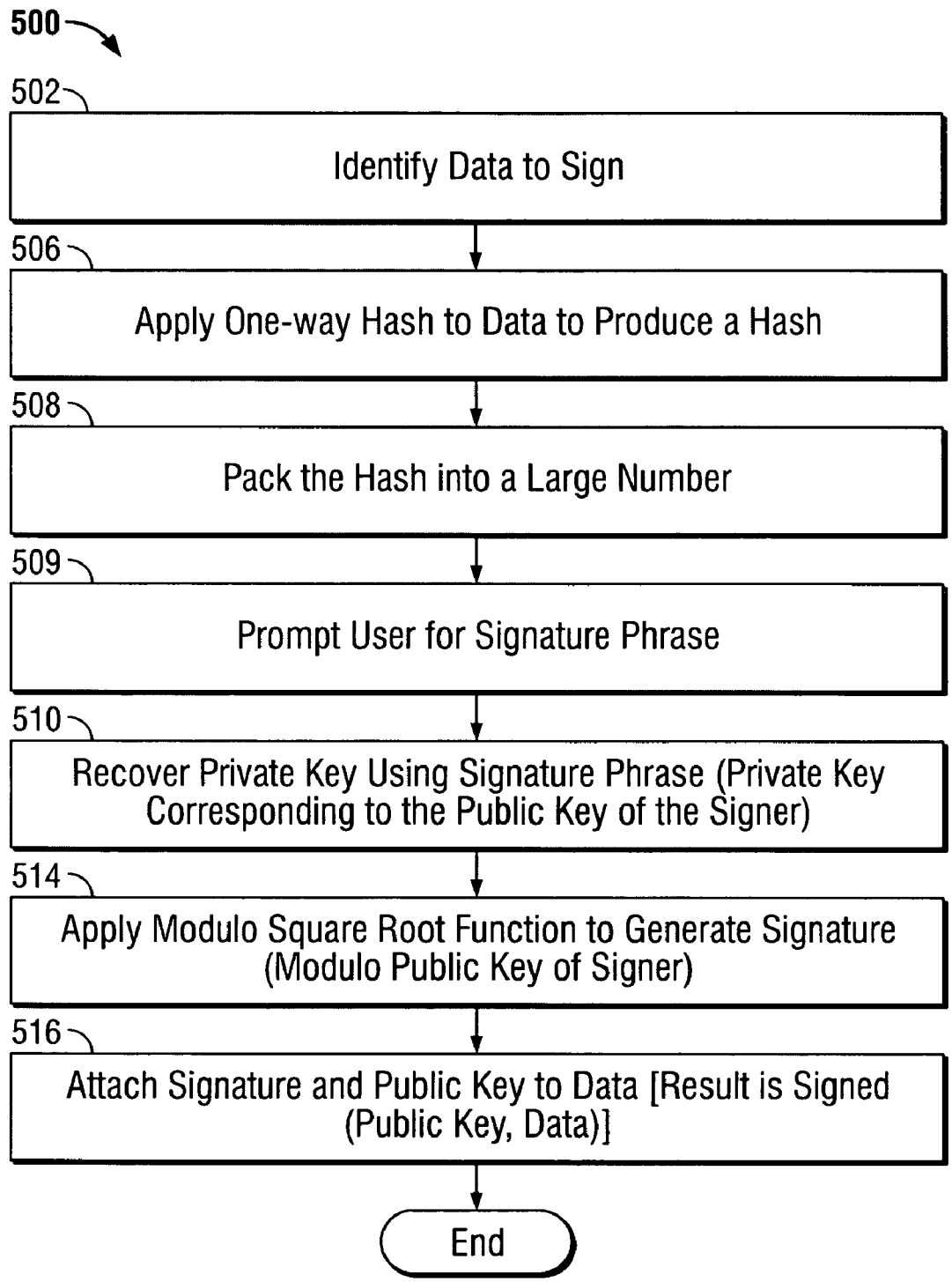
FIG. 5 is a flow diagram for a signing process.

Referring now to FIG. 5, a signing process 500, denoted Signed (PublicKey, data), for signing data using the private key associated with a public key is shown. Data (e.g., a message) to be signed is identified (502). A one-way hash function is applied to the data to produce a hash (506). In one implementation, an MD5 hash function is applied to the message producing a 128-bit hash.

The hash is packed into a large number (508). In one implementation, the hash is packed using an ISO 9796 standard format. Care is taken in the packing process to ensure that the large number has a Jacobi symbol of one ("1"). If the packing method does not produce a number having a Jacobi symbol of one ("1"), then the number can be divided by two ("2") producing a resultant number having a Jacobi symbol equal to one ("1").

Thereafter, the large number is signed. More specifically, the user is prompted for his/her signature phrase (509), which is used to recover the private key corresponding to the public key of the signer that is stored in key file 133 (510). A modulo square root function is applied to the large number producing a result (a signature) (514). In one implementation, a modular square root function is applied as described in *Handbook of Applied Cryptography*, by Alfred J. Menezes, Paul C. Van Oorshot and Scott Vanstone, 2nd Edition, 1997, page 292. The modulo square root function takes the square root of the number (the large number), modulo the public key of the signer. If the number does not have a modulo square root, then the square root function returns the square root of the public key minus the number (the large number). The result forms the signature and can be attached along with the public key of the signer to the data (message). The result is denoted by Signed (Public Key, data) where the public key is the public key of the signer (516). The signature can be verified using a verification process.

Verification Processes

Two verification processes are invoked by the recipient to verify the integrity of a secure message. A signature verification process is invoked to verify data signed in accordance with the signing process 500 described above. A time stamp certificate process is invoked to verify a time stamp certificate.

i. Signature Verification

Figure 6A:
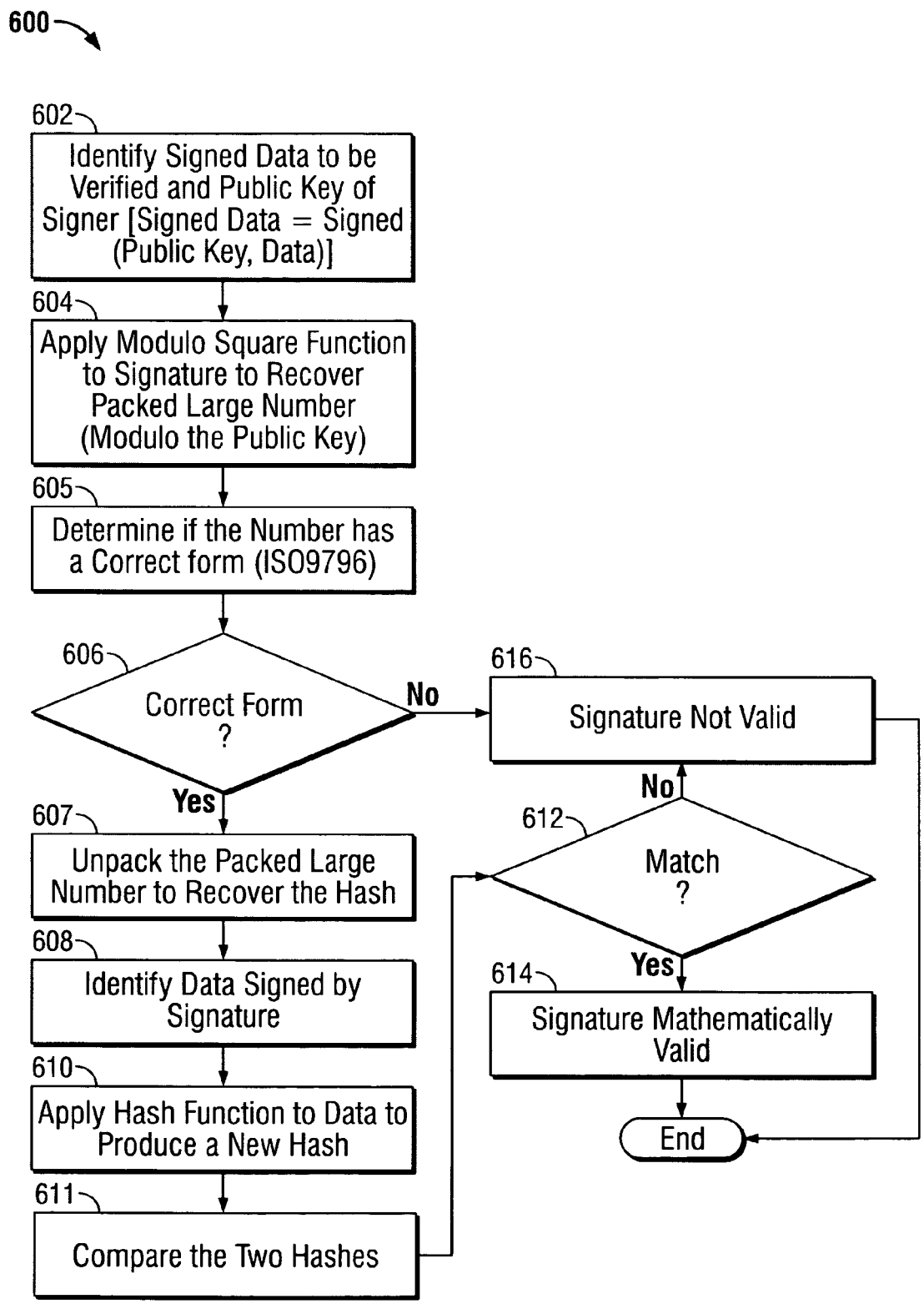
FIG. 6a is a flow diagram for a verification process for signed data in accordance with the signing process of FIG. 5.

A mathematical verification is performed on each signed message (signature) to ensure that the signed message is authentic. Referring now to FIG. 6*a*, a mathematical verification process 600 for verifying a signature is shown. A signature (signed data) to be verified along with the public key of the signer [signed date=Signed (Public Key, data)] are identified (602). A modulo square function is applied to the signature (number) to recover a packed large number (604). The modulo square function uses the public key of the sender as the modulus and produces as an output a number.

A check is made to determine if the packed large number is of a correct form (605). In one implementation, the packed large number must conform to a ISO 9796 format. If the form is not correct (606) the signature is not valid (616) and the process ends.

If the format is correct, the packed large number is unpacked to recover the hash (the hash produced in the signing process, e.g., the 128 bit number) (607). The data signed by the signature is identified (608). The same one-way hash function used in the signing process is applied to the data to produce a new hash (610). The new hash and the recovered hash (recovered in step 607) are compared (611). If they match (612), then the signature is mathematically valid (614). If they do not match, then the signature is invalid (616).

ii. Time Stamp Certification Verification

Figure 6B:
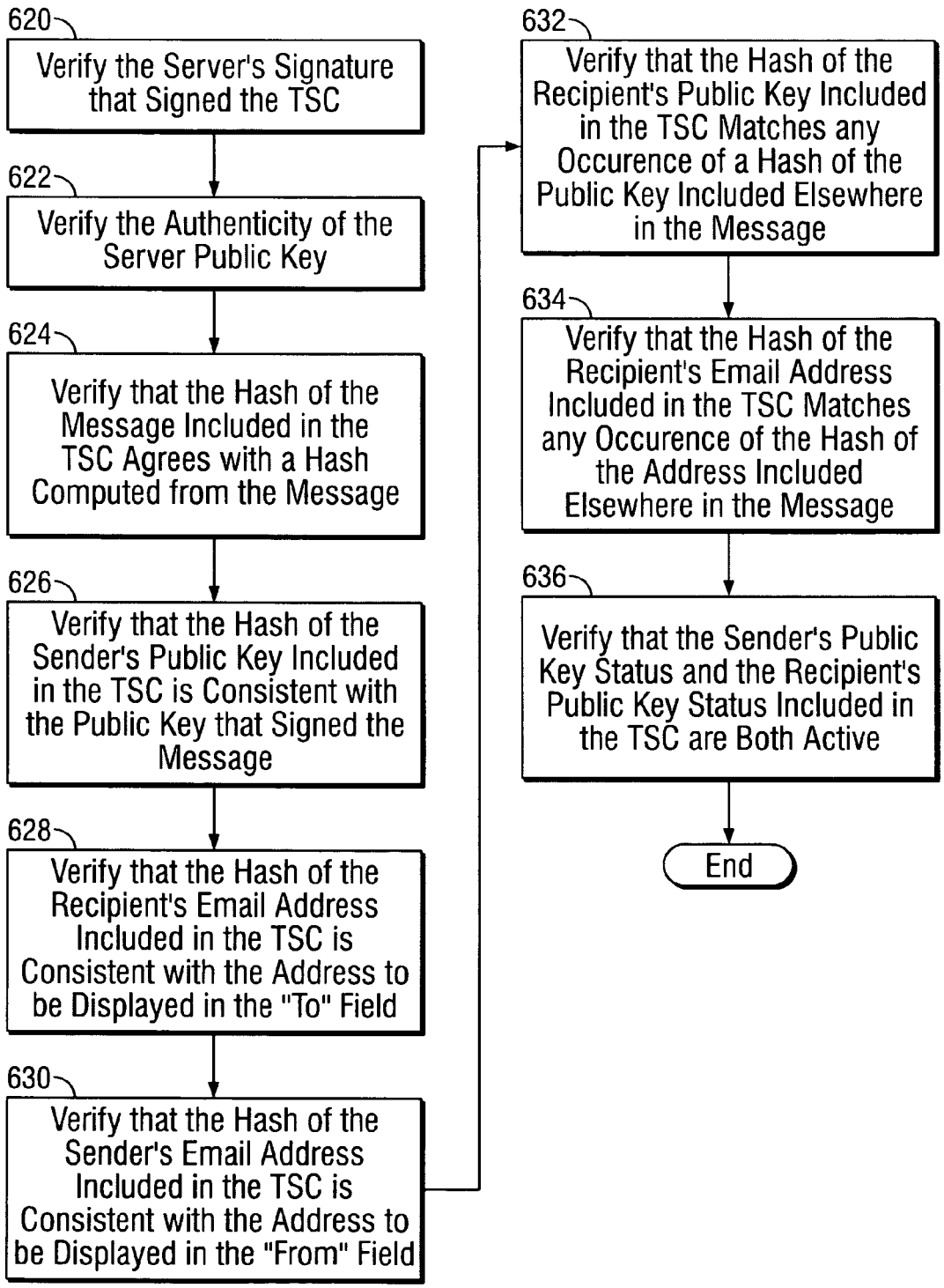
FIG. 6b is a flow diagram for a verification process for a time stamp certificate.

The process for verifying a time stamp certificate (step 261 of FIG. 2*b*) is shown in FIG. 6*b*. The process includes nine verification steps, which can be executed in any order:

1) Verify the server's signature that signed the TSC (using verification process 600) (620);

2) Verify the authenticity of the server's public key (apply verification process 600 four times to key server certificate) (622);

3) Verify that the hash of the message included in the TSC agrees with a hash computed from the message (624);

4) Verify that the hash of the sender's public key included in the TSC is consistent with the hash of the sender's public key that signed the message (626);

5) Verify that the hash of the recipient's E-mail address included in the TSC is consistent with the hash of the E-mail address to be displayed in the "To:" field (628);

6) Verify that the hash of the sender's E-mail address included in the TSC is consistent with the E-mail address to be displayed in the "From:" field (630);

7) Verify that the hash of the recipient's public key included in the TSC matches any occurrence of the hash of the recipient's public key included elsewhere in the message (e.g., in the header of the encrypted message) (632);

8) Verify that the hash of the recipient's E-mail address included in the TSC matches any occurrence of the hash of the recipient's E-mail address included elsewhere in the message (e.g., in the header of the encrypted message) (634);

9) Verify that sender's public key status and the recipient's public key status included in the TSC are both active (this verifies that the keys are active at the time sent) (636).

Understanding these general processes, the individual processes executed by the sender, server and recipient are described below.

Client Sender Process

Figure 7A:
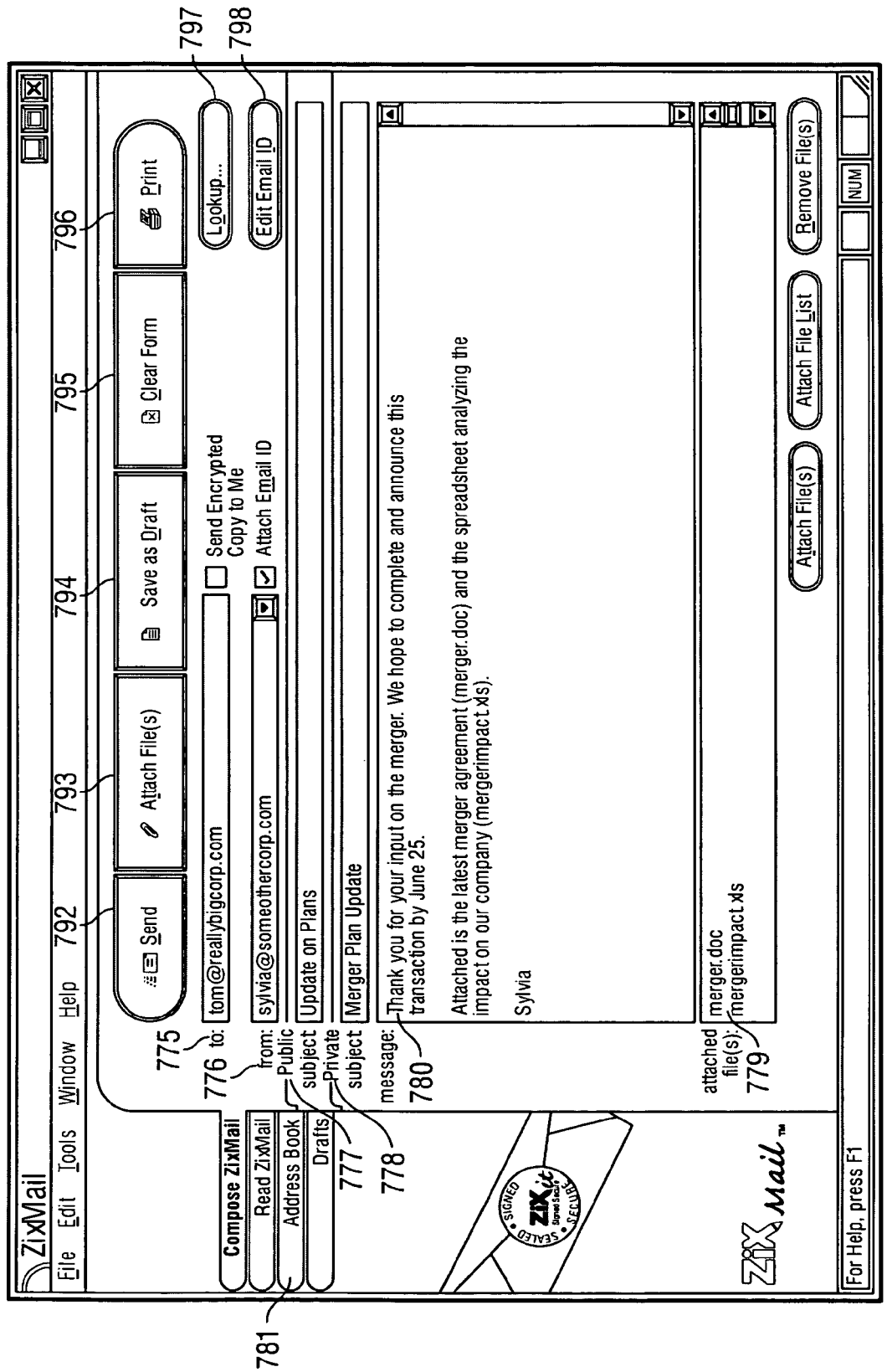
FIG. 7a shows a user interface presented by a wrapping application.

The process 248 for sending a secure E-mail message is described above and shown in FIG. 2*b*. FIG. 7*a* shows a user interface presented by wrapper application 128 which can be manipulated to compose a secure E-mail message. Fields are included for entering a recipient's E-mail address 775, a sender's E-mail address 776, public title 777, private title 778, attachments field 779 and message body 780. Buttons are included for attaching files 793, saving a draft 794, clearing a form 795, printing a message 796, looking-up an E-mail address 797 and editing an E-mail ID 798. Activation of button 781 can provide access to a conventional address book that includes E-mail addresses (along with other recipient information). Public title 777 is a placeholder for a title to be displayed when an E-mail containing a secure E-mail message is displayed in a conventional E-mail application. Private title 778 is placeholder for a title for the secure portion of the E-mail transmission and is only visible when the secure portion of the E-mail transmission is viewed using viewer 130 (FIG. 1). Attachments field 779 is a field used to indicate documents that have been attached to the secure message. Files can be attached to a message using attachment button 790. All attachments are first compressed and then encrypted along with the contents of the message body 780 and private title 778 forming the encrypted portion of the E-mail message transmitted to the recipient.

A public key retrieval request is generated and sent to key server 108 (FIG. 1) or a key retrieval server 180 (FIG. 1) to retrieve the public key of the recipient when the send button 792 is depressed. The key retrieval request includes the E-mail address (or hash of the E-mail address) of the recipient, a hash of the message and the sender's E-mail address (or hash of the E-mail address). The request can itself be encoded, by first retrieving the public key for the server. The public key can then be used in encrypting the request message so as to anonymize the link between the sender and the recipient.

Figure 7B:
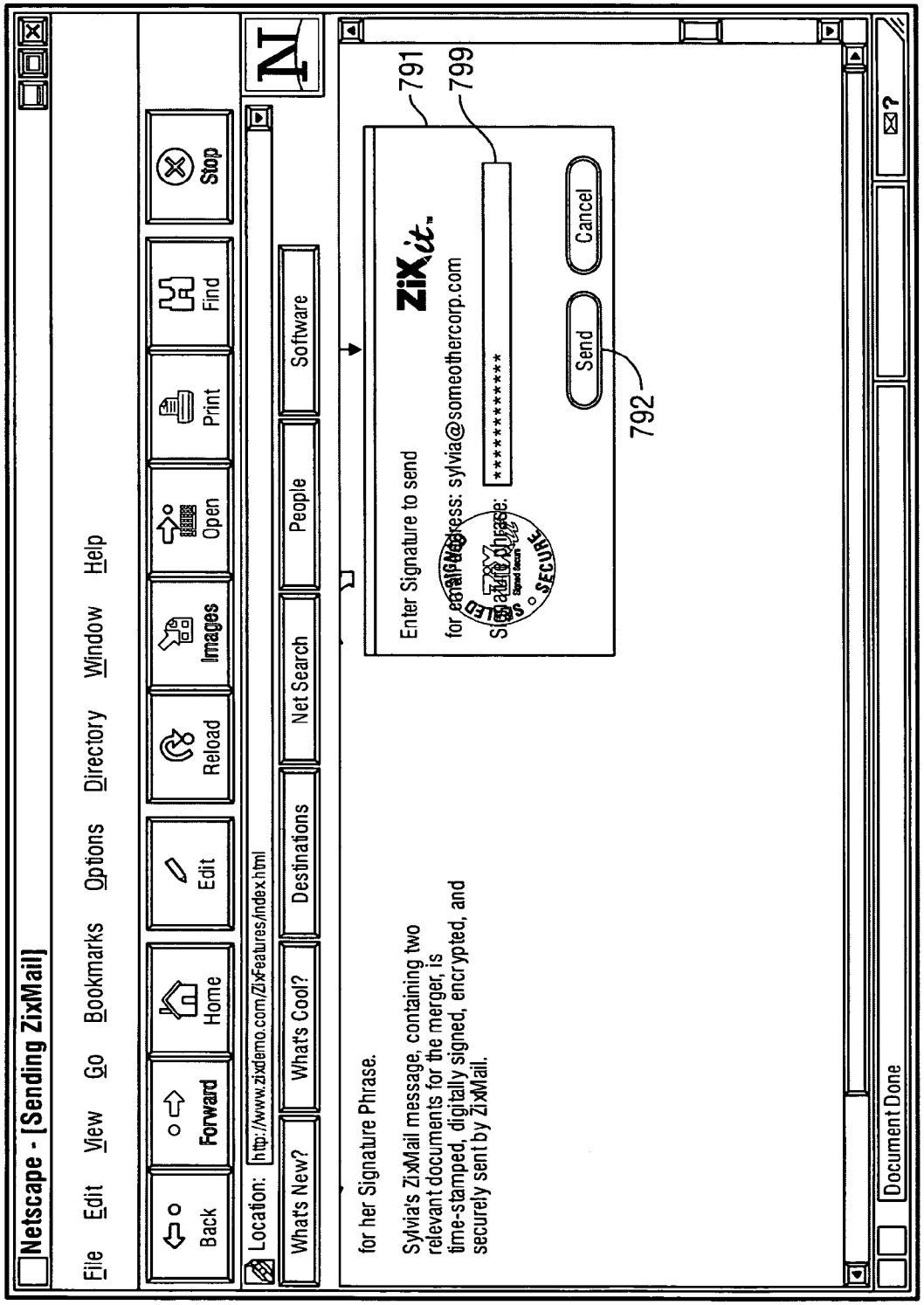
FIG. 7b shows a user interface presented by the wrapping application when a send button is depressed.

FIG. 7*b* shows a user interface presented by wrapping application 128 (FIG. 1) when send button 792 is depressed. A field is included for entering a sender's signature phrase 799. The user is prompted to enter a signature phrase. If the signature phrase is correct, then a public key for the recipient is retrieved along with a time stamp certificate. Upon receipt of the public key and time stamp certificate, the wrapping application encrypts and wraps the message and sends the message and time stamp certificate to the recipient. If the user does not have access to a SMTP server, then the user can be prompted to save the message as an encrypted file which can in turn be attached to a conventional E-mail message and delivered to the recipient using a conventional E-mail service. In the alternative, in one implementation, key server 108 may specify an SMTP server for the user. In one implementation, the HTTP forwarding service can be used to forward the encrypted file.

Key Server Processes

Key server 108 (FIG. 1) includes numerous processes in support of the transmission of secure E-mail messages. Each user executes an initialization process that includes a key server portion as described above with regard to FIG. 2g. In addition, key server 108 (FIG. 1) invokes various processes in support of key recovery, deletion and change operations as well as in support of key list publication using key retrieval servers 180 (FIG. 1). Two particular processes, a time stamp process and a status retrieval process, are described in greater detail below in association with FIGS. 8a and 8b.

Figure 8A:
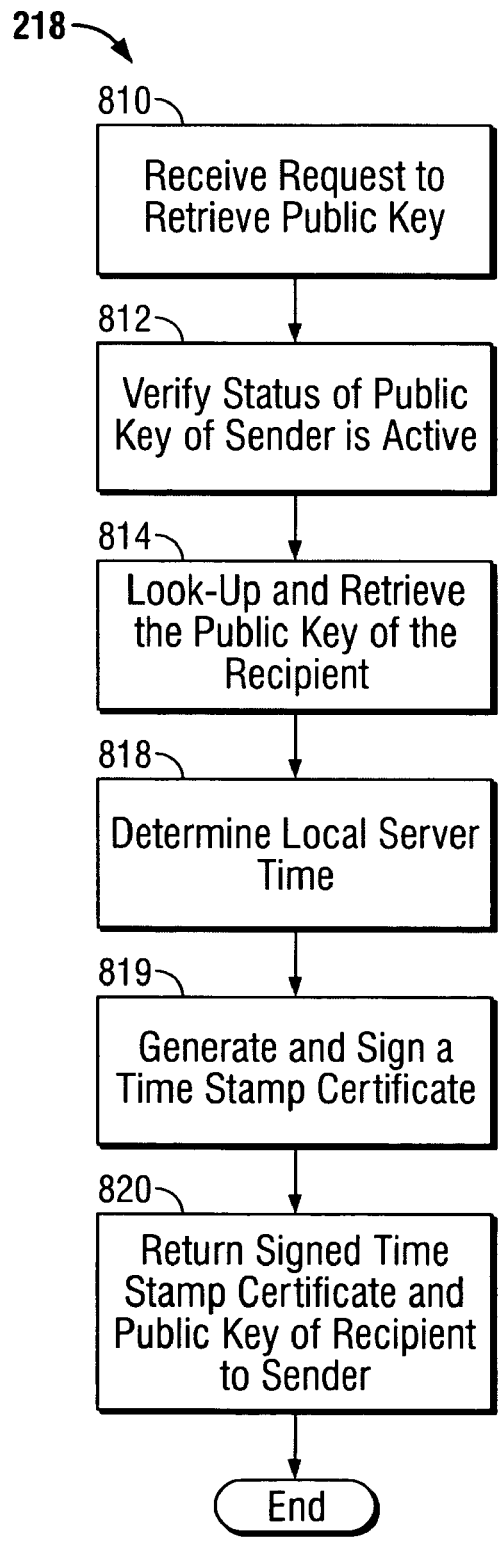
FIG. 8a is a flow diagram of a key server stamp process.

Referring now to FIGS. 1 and 8a, a time stamp process 218 is shown. The time stamp process begins when key server 108 receives a request from a user to retrieve a particular recipient's public key (810). The request includes the E-mail address of the recipient and a hash of the message (and attached files) to be sent. The request can be signed by the sender. The key server verifies that the public key of the sender is active (812) and looks-up and retrieves the public key of the recipient in key list 208 using the E-mail address (814). If the public key status for the sender is not active, then the recipient's public key is not returned to the sender, thereby preventing transmission of the secure message. Assuming the public key status is active, the server determines a local server time (818), generates a signed time stamp certificate (819) and returns it to the sender along with the public key(s) of the recipient(s) (820). Key server 108 can include a time standard, atomic clock or other means for determining the correct time. The requested public key and the time stamp certificate are signed by a key server private key.

The process of signing the time stamp certificate by the key server can include numerous individual steps. In one implementation, a key server certificate is attached to the document to be signed by the key server. The key server certificate, also referred to as the root certificate, is comprised of the server's public key signed by the four separate private keys whose corresponding public keys are coded into the viewer or stored elsewhere in a user's computer. The private key that corresponds to the public key that is certified by the key server certificate is in turn used to sign the document and attached key server certificate. For example, the process of signing a time stamp certificate includes: 1) generating a key server certificate for a public key of the key server (which can be pre-signed and stored at the key server); 2) attaching the key server certificate to the time stamp certificate; and, 3) signing the time stamp certificate and attached key server certificate using the public key certified by the key server certificate. In one implementation, the key server publishes an active public key as well as older deactivated keys. The inclusion of a key server certificate allows for the validation of the signature of a given document. The public key of the server can be changed at any time. In one implementation, the key server maintains a plurality of public (and private) keys.

In the implementation described above, a time stamp certificate is created and returned to the user. The time stamp certificate can be created by combining a key server transaction identifier (ID) and the hash of the message to be transmitted. The transaction information includes a pointer to a data record. Key server 108 maintains a record for all executed processes. When servicing a time stamp request, the record includes from information (sender), to information (recipients) or their hashes, the hash of the message, the hashes of the sender's as well as recipients' public keys and time data. The time stamp certificate is signed by the key server using a private key of the key server producing a signed time stamp certificate as described above. The signing of the time stamp certificate by key server 108 prevents tampering with the time stamp. The recipient can easily verify the time stamp certificate using the public key for key server 108 and be assured that the time is correct and has not been altered and that the time stamp certificate was not produced for another document. The authenticity of the server's public key used to sign the time stamp certificate can be verified by the key server certificate attached to the time stamp certificate. The key server certificate can be verified by the four separate public keys hardwired into the signature manager and viewer applications. A time stamp certificate created in this way serves several purposes. The time stamp certificate certifies the sender, the recipient, the integrity of the message and the time the message was sent. It authenticates the recipient's as well as the sender's public key. It also certifies the status of these keys at the time the message was sent.

Figure 8B:
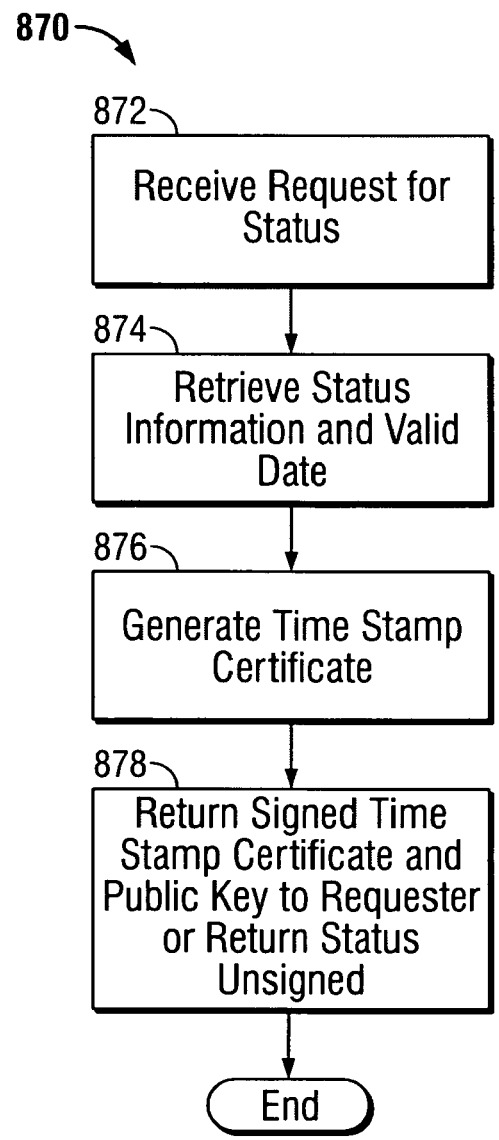
FIG. 8b is a flow diagram for a key server status retrieval process.

Referring now to FIGS. 1 and 8b, a process 870 for returning the status of a public key is shown. The process is executed by key server 108 or key retrieval server 180 and begins by receiving a request for status (872). The request can include an E-mail address, hash E-mail, key ID, on a public key, for the sender of the secure message and a key ID (hash of the public key of the sender). The status information and valid date information is retrieved for the public key from status list 209 (874). The status information (including valid date information signed by the server) and a certificate (signed by the four hardwired keys to certify key server) are retrieved and a time stamp certificate is produced (876). The time stamp certificate is returned to the requestor (878) and the process ends. In one implementation, a time stamp certificate that is of the same form as the time stamp certificate received by the sender when generating the secure message as part of the send process may be submitted. In one implementation, rather than a time stamp certificate, signed status information is returned. The status information can be signed by a private key of the key server. Alternatively, the status information can be unsigned.

Recipient Process

The process for viewing a secure E-mail message is described above and shown in FIG. 2c. The process includes verifying the sender's and the server's signatures, verifying the authenticity of the server's public key and retrieving the status of the sender's public key. The status of the sender's public key is displayed along with the contents of the secure message by viewer 130 (FIG. 1).

Figure 9:
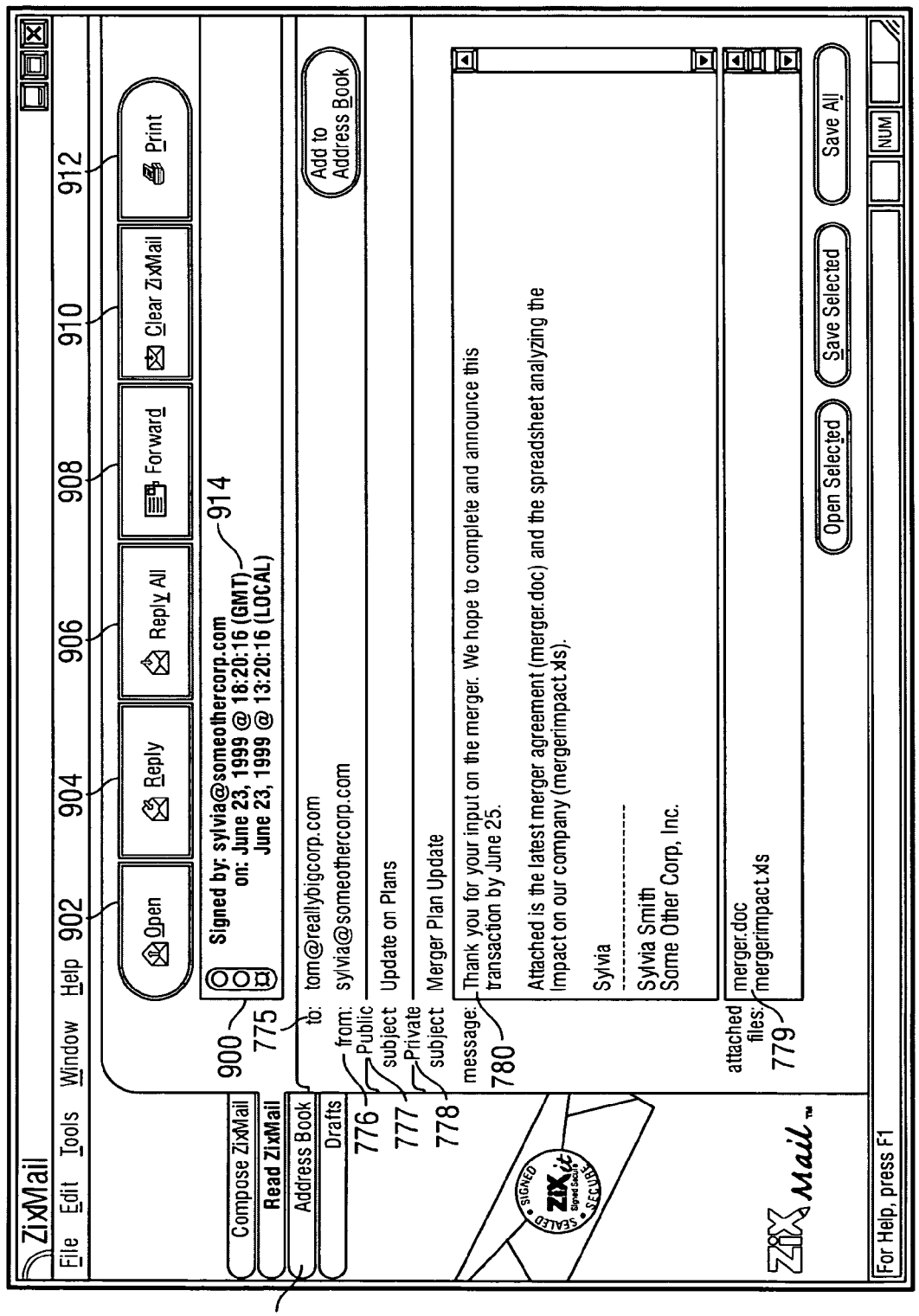
FIG. 9 shows a user interface presented by the viewer application.

A user interface presented by the viewer application is shown in FIG. 9. Fields, similar to the fields presented by the wrapping application user interface, display various portions of the secure E-mail contents after decryption. Buttons are included for opening a message 902, replying to a message 904, replying to all recipients 906, forwarding a message 908, clearing a message 910, and printing a message 912. In addition, a series of visual indicators 900 are provided to indicate the status of the signature verification process. In one implementation, one or more of the three visual indicators 900 are illuminated, as described below, in accordance with the information provided from key server 108 (FIG. 1). The status information returned from key server 108 (or key retrieval server 180) of FIG. 1 includes valid time and date(s) 914. The time stamp recovered from the decrypted received package is compared to the status information. One or more indicators that look similar to a traffic light or other differentiating indicator are illuminated depending on the comparison results. Combinations include:

green only illuminated—valid signature detected;

yellow and green illuminated—signature is mathematically valid, public key of sender was valid at time sent, but now is out of date or otherwise invalid;

yellow only illuminated—signature is mathematically valid, but the connection to the key server is not functioning and the recipient computer cannot connect for confirmation from the key server; and red only illuminated—all other conditions not listed above, including no key posted, no match of the public key with the E-mail address, tampering has occurred, message was signed after the key has been deactivated, etc.

Client and Key Server Processes

Numerous general processes for maintaining signature phrases and keys can be invoked by the user.

Figure 10A:
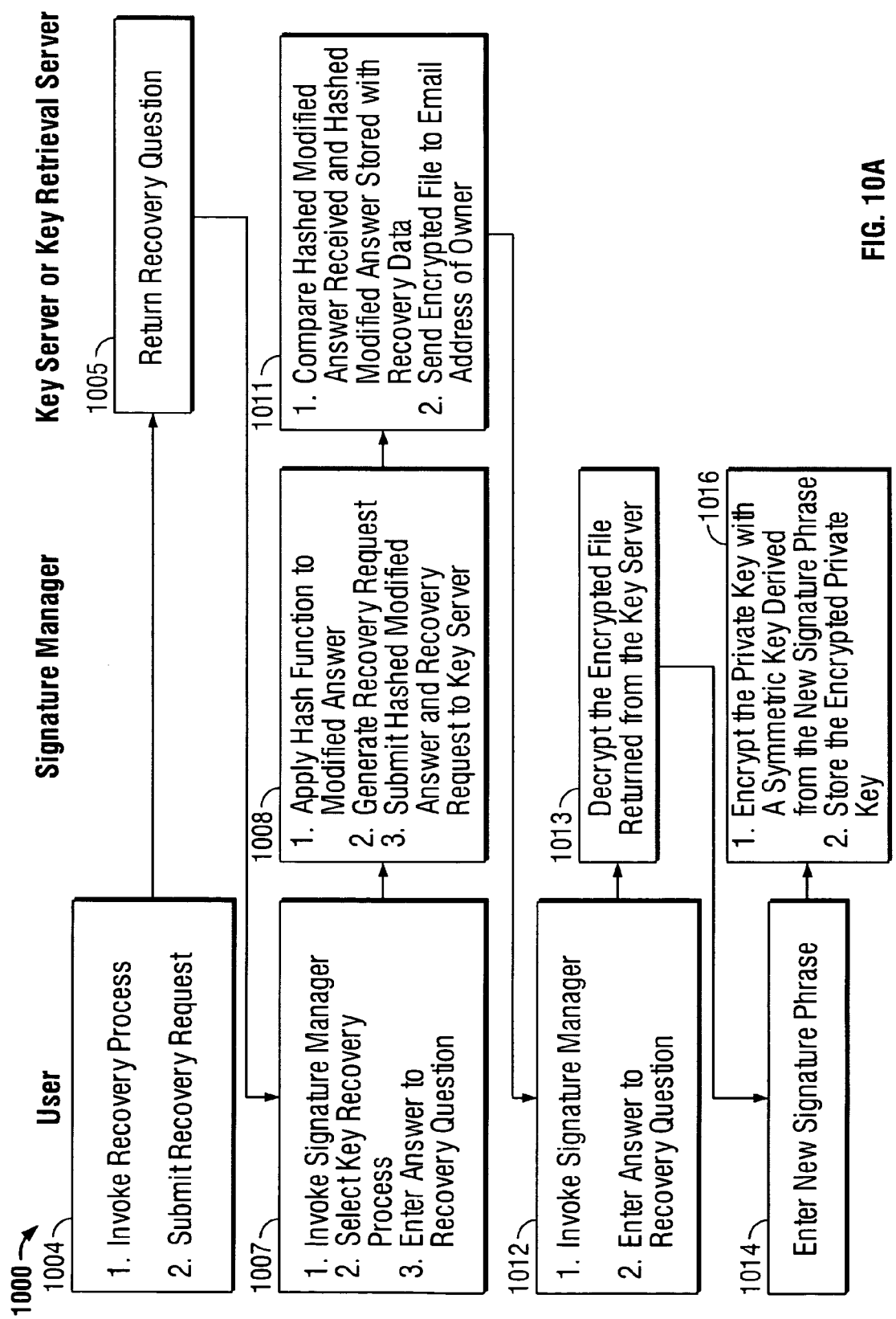
FIG. 10a is a flow diagram for a key recovery process.

Referring now to FIGS. 1 and 10*a*, a user process 1000 for recovering from a lost private key or forgotten signature phrase begins when a user forgets his/her signature phrase or has lost his/her private key (1002). The user invokes a recovery process and submits a recovery request (1004). In one implementation, the recovery process is invoked by calling or going to a key recovery web page. In one implementation, the process can be invoked in signature manager 132. Responsive to the recovery request, the user receives a recovery question from the key server (1005). The recovery question was created by the user during the initialization process for the generation of the private and public keys and stored by the key server.

Assuming the user remembers the answer to the recovery question, the private key of the user can be recovered. More specifically, in one implementation the user invokes signature manager 132, selects a key recovery process and enters the answer to the recovery question (1007). The signature manager applies a hash function to the modified answer (in a fashion similar to that described above in step 234 of FIG. 2*f*), generates a recovery request and submits both to key server 108 (1008). Key server 108 compares the hashed answer received with the hashed answer stored with the recovery data and, if they match, sends an encrypted file to the key owner's E-mail address (1011).

If the hashed answers do not match, an error message is returned. Upon receipt of the encrypted file, the user once again invokes signature manager 132 and reenters the answer (1012). Signature manager 132 uses the symmetric key derived from the answer to decrypt the encrypted file returned from key server 108 (1013). The resultant decrypted data includes the private key and the pre-computed data generated in the initialization process. Thereafter, the user is prompted to enter a new signature phrase that is to be associated with the recovered private key (1014). Signature manager 132 encrypts the private key with a symmetric key derived from the new signature phrase and stores the encrypted private key in key file 133 (1016). Thereafter the process ends. This type of recovery does not require that the actual signature phrase be stored at key server 108.

In the recovery process described above, the answer to the recovery question is never exposed to the key server or key retrieval server (or interlopers viewing communications between the user and the key server or key retrieval server). Only the hash of the modified answer is sent to the key server/key retrieval server. In this way, the answer is never exposed yet the system can authenticate the person requesting a key recovery.

Figure 10B:
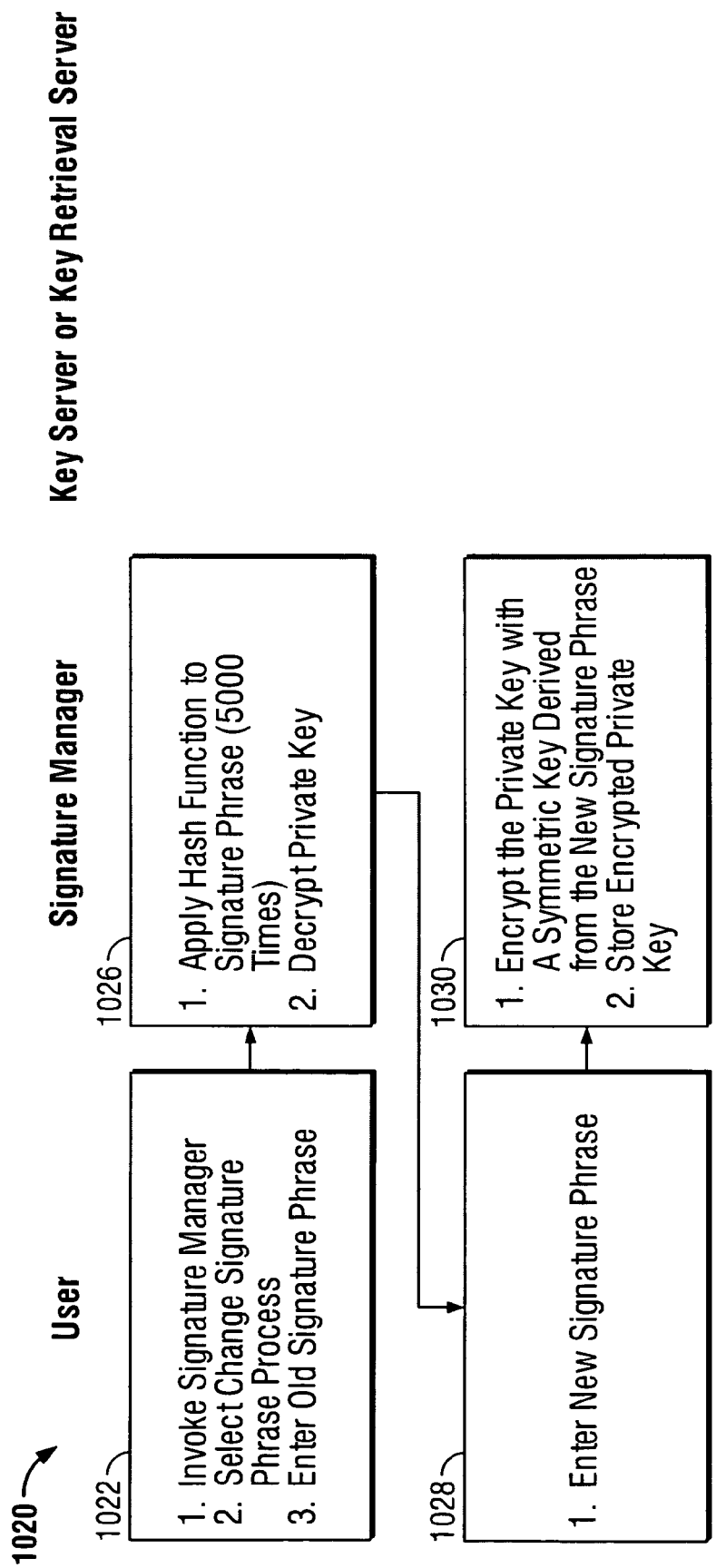
FIG. 10b is a flow diagram for changing a signature phrase.

Another common process is the changing of a signature phrase. Referring now to FIGS. 1 and 10*b*, a process 1020 for changing a signature phrase begins by invoking signature manager 132, selecting a change signature phrase process and entering the old signature phrase (1022). Signature manager 132 applies a large number of hashes (HASH5000) to the old signature phrase to derive a symmetric key from the signature phrase and uses the symmetric key to decrypt the private key of the user (1026). The user enters a new signature phrase (1028). Signature manager 132 encrypts the private key with the symmetric key derived from the new signature phrase and stores the encrypted private key in key file 133 (1030). Thereafter, the process ends. This process is effective even if multiple keys are stored in key file 133. All previous keys are changed to reflect the new signature phrase.

Keys can be changed by a user in the event a private key is compromised or otherwise suspect. The process for changing keys is the same as the key generation process described in FIGS. 2*d*-2*h*, except for the following differences:

1) In step 232 of FIG. 2*e*, the packed data is signed by the new and old private keys;

2) In step 54 of FIG. 2*g*, the signatures of both the old key and the new key are verified; and 3) When the new key is activated in step 67 of FIG. 2*g*, the old key is deactivated. Documents signed by a user before a deactivation time will continue to be indicated as being valid.

Figure 10C:
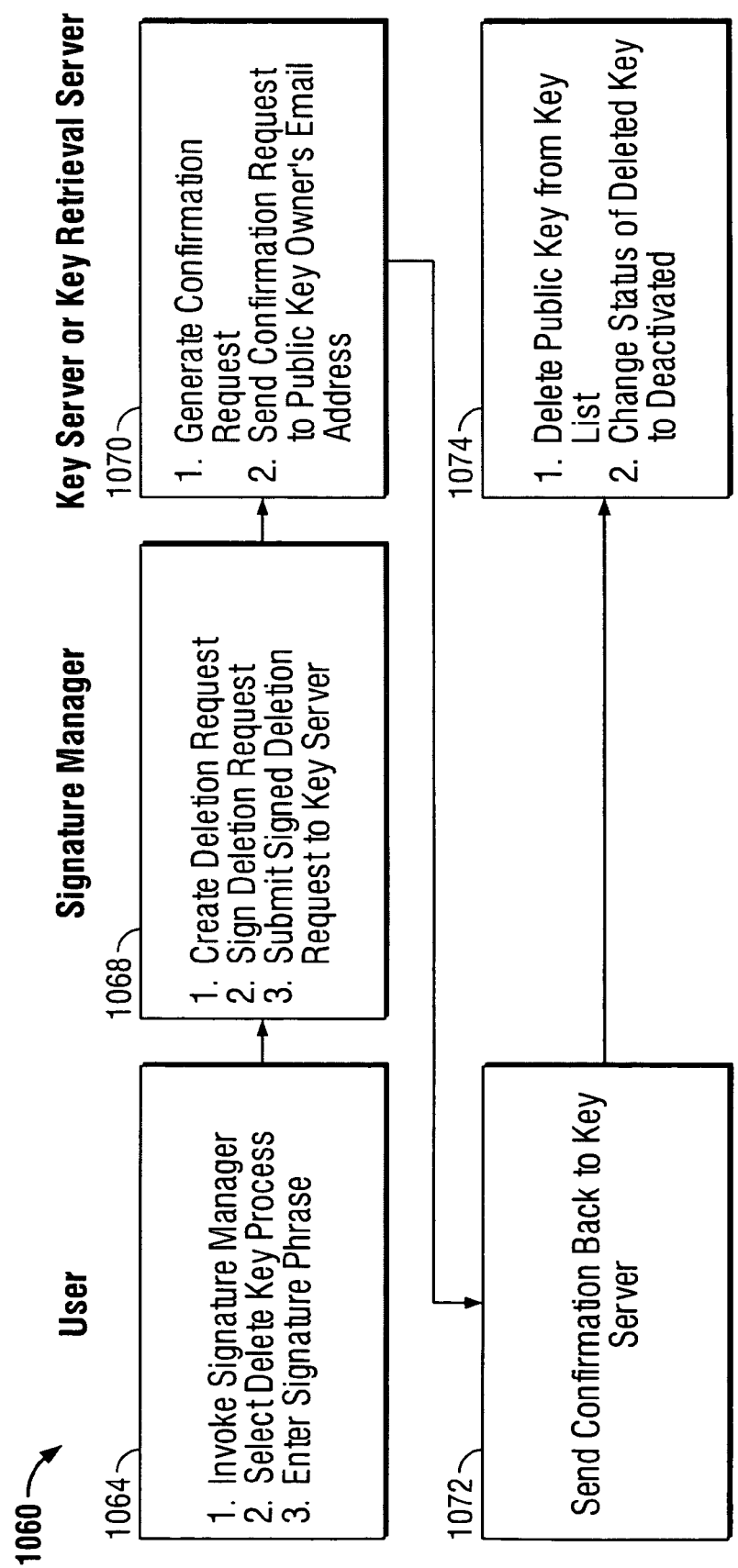
FIG. 10c is a flow diagram for deleting a key.

Referring to FIGS. 1 and 10*c*, when a user desires to delete a public key from the key list maintained by key server 108 or key retrieval server 180, a delete key process can be invoked. A process 1060 for deleting a public key includes invoking the signature manager, selecting a key deletion process and entering his/her signature phrase (1064). If the signature phrase entered is correct, signature manager 132 creates a deletion request, signs the deletion request and submits the signed deletion request to key server 108 (1068). The request is signed using the private key of the user. Key server 108 verifies the signature in the deletion request to ensure that the request has been submitted by the rightful owner of the public key to be deleted. Key server 108 then generates a confirmation request and sends the request to the public key owner's E-mail address (associated with the key to be deleted) (1070). Assuming the owner desires to delete the key, the owner generates an E-mail confirmation response and sends the response back to key server 108 (1072). The key server deletes the public key from key list 133 and deactivates the key in the status list (1074). While the key may be deleted from the key list, the status list still maintains the status of the public key. Deleted keys have a deactivated status and an associated deactivation time that is set to the time that the deactivation became effective. After the public key is deactivated (deleted), no key can be retrieved for the associated E-mail address until a new key is generated. Deleted keys remain in the key file 133, but have an associated deleted date.

Forwarding Proxy

Referring to FIG. 1, wrapping application 1*k*128 can send secure E-mail messages directly, or a conventional E-mail system can be used to forward the secure portions of the messages as part of an attachment to a conventional E-mail message. While one implementation of the invention requires the client sender to have access to a SMTP server, an alternative implementation provides a method for easy transmission when no SMTP server is accessible. Wrapping application 128 can invoke HTTP post application 124 to send the secure message with an HTTP post.

More specifically, the recipient's E-mail address, sender's E-mail address, public subject, public message and a MIME attachment that includes the encrypted message [PKE (recipient's key, Signed (senderkey, compressed (message)+TSC))] are sent to URL associated with a forwarding proxy. The forwarding proxy, such as HTTP and forwarding proxy server application 204 executing on key server 108, recovers the secure message from the HTTP post and forwards the message as an attachment to a conventional E-mail message. The forwarding proxy server constructs a conventional E-mail message using the public message and recipient E-mail address, attaches the encrypted data as a MIME attachment and sends or otherwise relays the constructed E-mail message by SMTP.

A forwarding proxy server can advantageously be used to hide the sender and the recipient's identity. The existence of an exchange between a sender and a recipient may itself be sensitive information. By separating the sender and the recipient using a forwarding proxy server, an interloper could only see that the sender sent a message to the forwarding proxy server or that the recipient received a message from the forwarding proxy server. However, no connection between these two events is readily apparent. An anonymous send process can be invoked to anonymize the sender's and recipient's identities.

The anonymous send process begins with the receipt of an HTTP post by the forwarding proxy server that includes public key encrypted data and a MIME attachment. The public key encrypted data, which is encrypted by the public key of the forwarding proxy server, can include the recipient's E-mail address. The forwarding proxy server decrypts the public key encrypted data using the forwarding proxy server's private key to recover the underlying data (recipient's E-mail address, the sender's E-mail address, the public subject, the public message and a hash of the recipient's public key). A MIME attachment is constructed that includes the hash of the recipient's E-mail address, hash of the recipient's public key, ESKH and the encrypted message [SKE (session key, data) (which includes the sender's E-mail address)]. The forwarding proxy server composes the MIME mail, using the recipient's E-mail address and the public message, attaches the MIME message and forwards the message to the recipient's E-mail address. The "from address" can be listed as the forwarding proxy server, thus no interloper can detect the identity of the sender.

Spam Control Measures

Spamming control measures, such as the following, can be implemented to minimize the possibility of spam transmissions.

During key retrieval (retrieval of the public key of the recipient), key server 108 can send a periodically-generated random number to the client sender. The random number can be attached to the data posted by HTTP (or SMTP using conventional E-mail systems). The server (SMTP) can reject messages based on invalid or outdated random numbers. For example, the random number can have a life span (valid time window for transmissions through the server) of up to one minute. A spammer would be required to retrieve keys every minute, making a spamming transmission process more difficult.

The HTTP server (and SMTP server) receives the hash of the recipient's E-mail message as part of the package that is forwarded to the recipient (MIME attachment). A check can be performed on the recipient's E-mail address to see if it matches (after hashing) the hash provided with the package. A spammer would be forced to compute a hash for every recipient, making the transmission process slower.

A third, more secure measure requires the verification of a signature. More specifically, a random number is included in the result of the key retrieval (as described above). The random number is signed by the sender and signed data [Signed (sender key, random number+recipient E-mail address)] is attached to the data post (the HTTP post from the HTTP posting application in the client sender). The forwarding proxy server can be configured to only accept posts when the signature is verified and the random number matches the number sent during the key retrieval.

Return Receipt

When composing a message, a sender may set a flag in the data to indicate that a return receipt is requested. When the recipient receives the message, viewer 130 recognizes the flag and alerts the recipient indicating that the message is a Return-Receipt-Requested Mail. The recipient is given the choice of whether to send the return receipt.

If the recipient agrees to send the return receipt, the time stamp certificate in the received mail will be signed for the recipient and sent to key server 108. This produces a signed time stamp certificate, denoted Signed(RecipientKey, TSC). Since the recipient has already entered the signature phrase when decrypting the message, there is no need to enter the signature phrase again to sign the receipt.

Key server 108 (FIG. 1) receives the signed time stamp certificate (Signed(RecipientKey, TSC)), adds the current time (the receive time), signs the package, and sends it to the original sender as the return receipt. In other words, the return receipt is:

Signed(ServerKey, Signed(RecipientKey, TSC)+ReceiveTime).

The receipt includes the certified receive time along with a TSC which contains the certified send time, a hash of the original message sent [HASH(Compressed(Message))] and the E-mail addresses of the sender and recipient and, optionally, a server transaction number and public subject field.

A different way of sending a return receipt is for the recipient to retrieve a second time stamp certificate from the server (which certifies the time the message was received) and then send both the TSC of sending time and TSC of receiving time to the sender, with both TSCs being signed and encrypted. More specifically, the return receipt is: PKE(SenderPublicKey, Signed(RecipientKey, TSC(send time)+TSC(receive time)+OtherInfo)), where OtherInfo may contain the public subject or other information for display and other purposes.

Certified Mail

Certified Mail can be sent by a sender to a recipient. The process for certified mail is the same as the Receipt-Requested-Mail process described above except that the recipient is not allowed to read the message unless they agree to send a certified receipt.

While this invention has been described in terms of several preferred implementations, it is contemplated that alterations, modifications and permutations thereof will become apparent to those skilled in the art upon a reading of the specification and study of the drawings.

Furthermore, certain terminology has been used for the purposes of descriptive clarity, and should not be construed to limit the invention. It is therefore intended that the following appended claims include all such alterations, modifications and permutations as fall within the true spirit and scope of the present invention.

What is claimed is:

1. A method for recovering lost keys in a public key encryption system that includes a central key repository and a plurality of users, where a user's public key is stored at the central key repository and user's associated private key is stored locally on a user's computer, the method comprising:

designating a recovery question and an answer to the recovery question;

encrypting the user's private key using a first hash of the answer as a session key in a symmetric key encryption process;

hashing the answer a predetermined number of times to generate a second hash of the answer;

storing the second hash and the recovery question at the central key repository without exposing the answer to the recovery question to the central key repository;

and when prompted by the user to recover a lost private key:

receiving the answer;

hashing the answer the predetermined number of times to generate a third hash and transmitting the third hash to the central key repository without transmitting the answer itself;

comparing the second and third hashes;

if the second and third hashes match, returning the encrypted private key to the user; and decrypting the private key using the first hash and storing the private key.

2. The method of claim 1, further comprising:

at a signature manager, hashing the answer to generate the first hash.

3. The method of claim 2, further comprising:

at the signature manager, decrypting the encrypted user's private key.

4. The method of claim 1, wherein:

hashing the answer a predetermined number of times to generate a second hash includes adding a constant string to the answer prior to hashing the answer.

5. The method of claim 1, further comprising:

storing a user's email address at the central key repository with the second hash and the recovery question.

6. A computer-implemented method comprising:

determining a recovery question having an answer to the recovery question;

encrypting data using a first hash of the answer as a symmetric key, wherein the answer has been hashed a first predetermined number of times to generate the first hash of the answer;

hashing the answer a second predetermined number of times to generate a second hash of the answer, wherein the first predetermined number of times differs from the second predetermined number of times;

storing the encrypted data, the second hash and the recovery question at a central repository, wherein the central repository does not receive the answer to the recovery question;

upon receiving a request for the data, providing the recovery question to a user and requesting the answer from the user;

upon the user providing the answer, hashing the provided answer the second predetermined number of times to generate a third hash of the answer;

transmitting the third hash to the central repository without transmitting the provided answer;

comparing the second and third hashes;

if the second and third hashes match, sending the encrypted data to the user; and decrypting the encrypted data using the symmetric key.

7. The method of claim 6, wherein:

hashing the answer a second predetermined number of times to generate a second hash includes adding a constant string to the answer prior to hashing the answer.

8. The method of claim 6, further comprising:

hashing the answer the first predetermined number of times to generate the first hash of the answer.

* * * * *